(12) United States Patent
Amos

(10) Patent No.: US 7,844,547 B2
(45) Date of Patent: Nov. 30, 2010

(54) UNCLE GEM IV, UNIVERSAL AUTOMATIC INSTANT MONEY, DATA AND PRECIOUS METAL AND STONE TRANSFER MACHINE

(76) Inventor: Carl Raymond Amos, 2250 Portofino Pl., #233, Palm Harbor, FL (US) 34683

( * ) Notice: Subject to any disclaimer, the term of this patent is extended or adjusted under 35 U.S.C. 154(b) by 1134 days.

(21) Appl. No.: 11/466,058

(22) Filed: Aug. 21, 2006

(65) Prior Publication Data

US 2009/0192938 A1     Jul. 30, 2009

(51) Int. Cl.
*G06Q 40/00*     (2006.01)

(52) U.S. Cl. .............................. 705/43; 705/41; 705/39; 235/379; 235/380

(58) Field of Classification Search ................... 705/43, 705/41; 235/379; 194/217
See application file for complete search history.

(56) References Cited

U.S. PATENT DOCUMENTS

| 520,013 | A | * | 5/1894 | Slocum | ..................... | 194/313 |
|---|---|---|---|---|---|---|
| 5,397,125 | A | * | 3/1995 | Adams | ........................ | 463/20 |
| 6,554,184 | B1 | * | 4/2003 | Amos | ......................... | 235/379 |
| 6,886,728 | B2 | * | 5/2005 | Roberts et al. | ............. | 225/103 |
| 6,994,202 | B1 | * | 2/2006 | Billington et al. | ........... | 194/217 |
| 7,014,554 | B1 | * | 3/2006 | Fletcher et al. | .............. | 453/20 |
| 7,143,062 | B2 | * | 11/2006 | Turk et al. | ..................... | 705/38 |
| 7,206,763 | B2 | * | 4/2007 | Turk | ............................ | 705/39 |

(Continued)

FOREIGN PATENT DOCUMENTS

JP     2002109428     4/2002

(Continued)

OTHER PUBLICATIONS

William Stanley Jevons, Articles of Ornament as Currency, Money and the Mechanism of Exchange 1875, http://oll.libertyfund.org/title/318/9892 on Jul. 13, 2010 (Exchange).*

(Continued)

*Primary Examiner*—Ella Colbert
*Assistant Examiner*—Chika Ojiaku

(57) ABSTRACT

The Universal Automatic Instant Money, Data and Gold Transfer Machine, Uncle GEM II, system is a multiplicity of devices on a communications network available 24 hours a day, used interchangeably as sender, receiver and dispenser of funds and data. The sender accepts standard currency and includes removable medium storage devices to transfer to another such device acting as a receiver/dispenser. Remitted amounts are inserted or deducted from credit/debit accounts or currency and who pays the fees charged is indicated by an initiator of the transaction. Transfer transaction information includes: the type of transfer (money/funds or data); which device deducts the fee; how much money or what data to transfer; and to who and where the transfer transaction is to be made available. A receipt is generated by the sender via the system and a receiver becomes a dispenser when the recipient retrieves a pending transaction using the appropriate password or identification. The cash, data, or financial instrument is then dispensed. The Uncle GEMs also feature acceptance of alternate payment options, such as, precious metal coins, i.e., gold, silver and platinum, and precious stones, i.e. diamonds, sapphires, and rubies. In essence, virtually anything can be bought, purchased, bartered, traded or sold. Smartcards, phonecards and store specific cards can be used to buy goods and services, can be bought, or can be reloaded using the Uncle GEM II system.

25 Claims, 22 Drawing Sheets

U.S. PATENT DOCUMENTS

| | | | |
|---|---|---|---|
| 7,445,146 B2 * | 11/2008 | Drummond et al. | 235/379 |
| 7,527,193 B2 * | 5/2009 | Molbak | 235/379 |
| 7,617,157 B2 * | 11/2009 | Seifert et al. | 705/43 |
| 7,641,109 B2 * | 1/2010 | Seifert et al. | 235/380 |
| 2002/0195309 A1 * | 12/2002 | Pope | 194/217 |
| 2004/0049324 A1 | 3/2004 | Walker | |
| 2004/0139000 A1 * | 7/2004 | Amos | 705/39 |
| 2006/0031160 A1 * | 2/2006 | Villa | 705/44 |
| 2007/0244812 A1 * | 10/2007 | Turk et al. | 705/39 |
| 2009/0192938 A1 * | 7/2009 | Amos | 705/43 |

FOREIGN PATENT DOCUMENTS

| | | |
|---|---|---|
| WO | 0184906 | 11/2001 |

OTHER PUBLICATIONS

Piedad Peniche Rivero, When cocoa was used as currency—pre-Columbian America—The Fortunes of Money, UNESCO Courier, Jan. 1990 (Fortunes).*

International Search Report for PCT/US07/76131, 4 pages issued Sep. 16, 2008.

* cited by examiner

Uncle Gem IV
Internal Network & System (INS)
Logical Data Flowchart

Uncle Gem IV INS / External Network
Logical Data Flowchart

Uncle Gem IV
Embodiment A

Uncle Gem IV
Embodiment A

Uncle Gem IV
Embodiment B

Uncle Gem IV
Embodiment C

Uncle Gem IV
Embodiment D

Uncle Gem IV with Multiple Interfaces
Embodiment E

Multi-Access Instant-Money Automatic Transfer Machine And ATM

Workflow Chart C

Uncle DGIM/AAIMTM
Logical Signal Control System Flowchart

Uncle Gem IV with Multitiered Interfaces

SDL Event and Process Model

Figure 18:
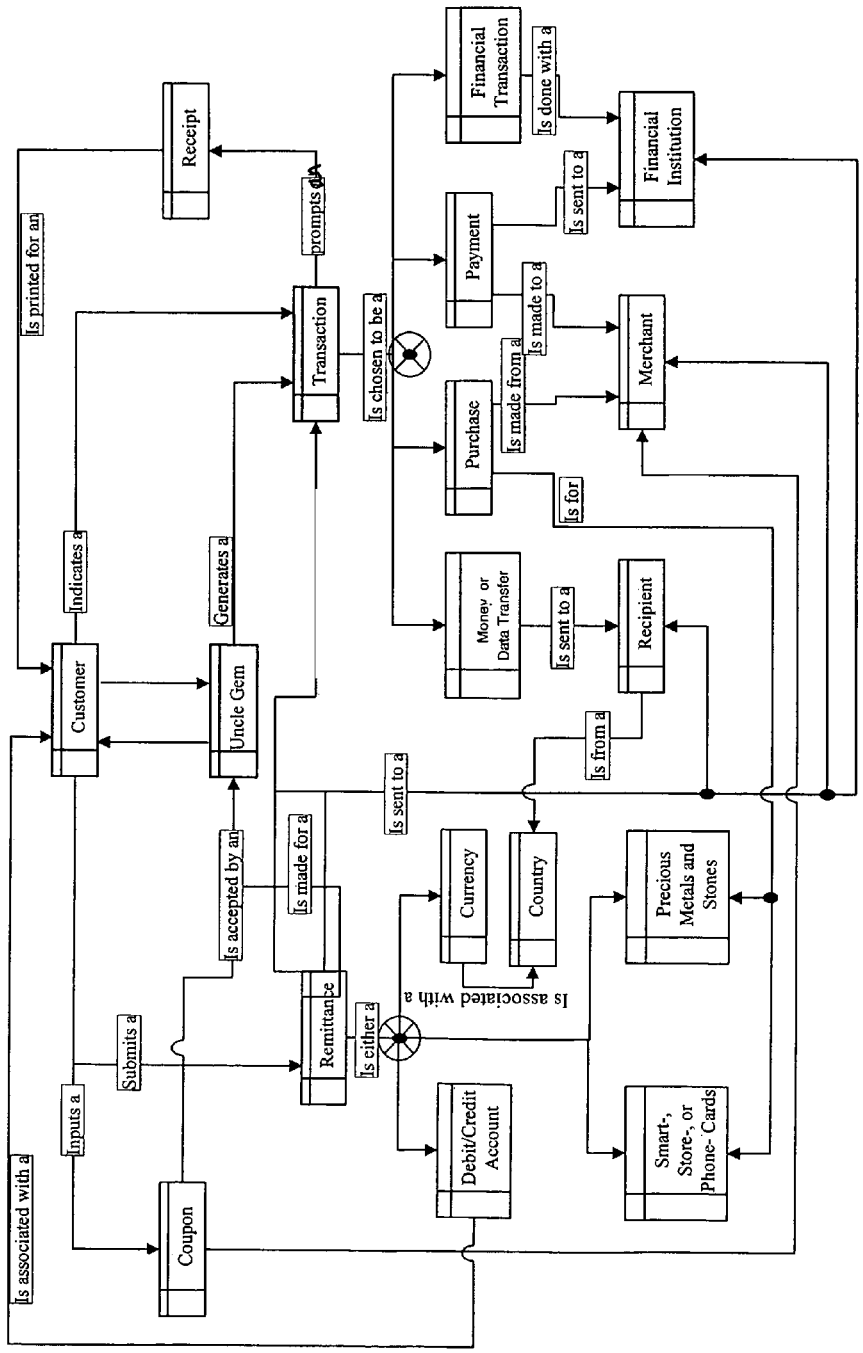

Fig. 18   Information Entity Relationship Diagram

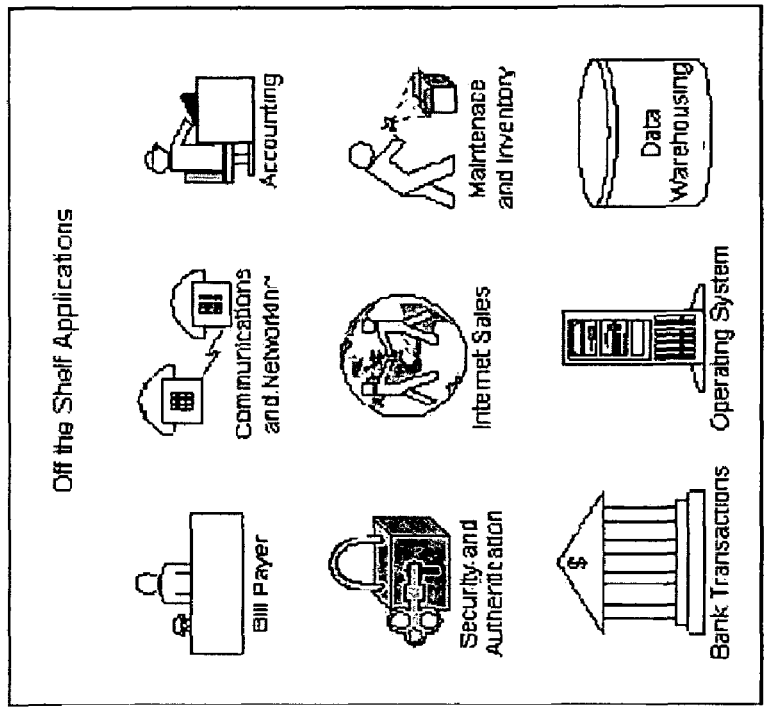
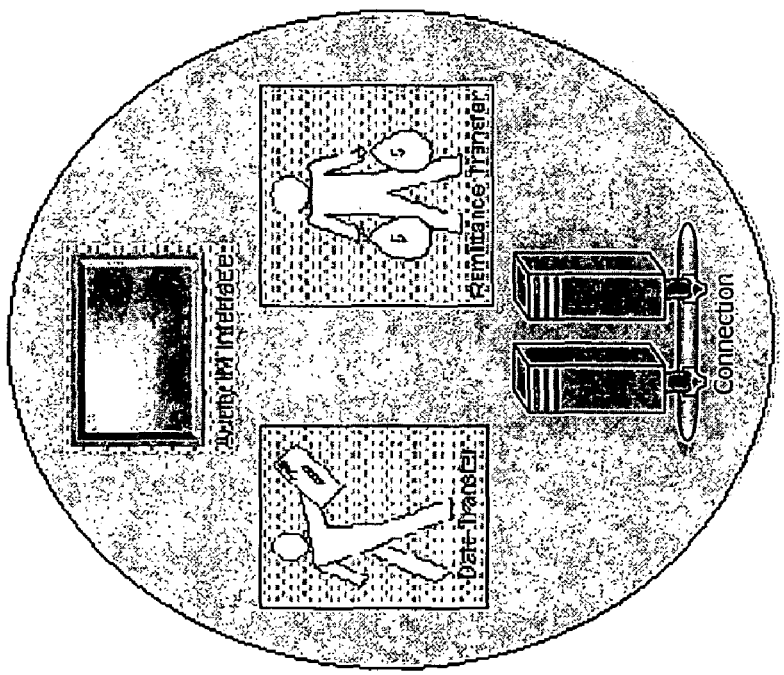
Custom Software | Required Software Functionality
Fig. 19

Aunty IM / Uncle GEM
Generic Vending Machine
W/Transfer Functions

Uncle GEM
Brand Vending Machine
w/Transfer Functions ered. The instant invention technology provides the option of
UNCLE GEM IV, UNIVERSAL AUTOMATIC INSTANT MONEY, DATA AND PRECIOUS METAL AND STONE TRANSFER MACHINE The instant invention is a new apparatus and system method & process that enables people to send and receive normal conventional bills, dollars, conventional coins and cents, and other financial conventional instruments used as currency, i.e., money orders, checks, etc., and the option of sending and or receiving buying and selling and payment, purchases and the settlement of debts including the option to send and receive or wire money transfer physical real precious metal, currency, i.e., Gold coins and bullion, Silver coins and bullion, Platinum coins & bullion, Palladium and other precious and semi-precious coins & bullion, universally accepted globally as currency.

The instant invention also allows for the sending and receiving of precious and semiprecious stones, i.e., Diamonds, Emeralds, Topaz, Tanzanite, Sapphire, Rubies, etc., used for currency purposes domestic and worldwide.

The instant invention allows anyone to interact with the internet world wide web and other communication means and have the simple choice of sending or receiving any currency of any denomination type and also allows them to receive or send precious metal coins anywhere and this is possible with or without having to have a bank account. The instant invention will allow anyone on the planet to have the right and ability regardless of race, religion, culture, ethnicity, creed, organization or color, the natural right to buy or sell anything on the globe.

The need for such a Hybrid improved ATM, i.e., Uncle Gem System, is due to the simple fact that normal paper currency is usually a debt or promise to pay, sometimes the currency is purported, claimed or assumed to be backed up by precious metals or gold silver etc. Many times it is not. Gold, Silver, Platinum are recognized universally as acceptable forms of payment for buying and selling. Furthermore, with the volatility in financial markets nationally and worldwide. In the event of high inflation and even hyper-inflation a conventional ATM and other money transfer machines such as those marketed by NCR, Moneygram, Diebold, First Data, Western Union, Walmart, Bank of America, and others, quickly become obsolete and inoperative and can easily go off-line, especially if a loaf of bread costs $1,000 or $10,000. Similar to what occurred in WWII Germany, Japan, Venezuela and currently in Zimbabwe, Africa where inflation is over 1,500% and climbing.

BACKGROUND OF THE INVENTION

ATMs are now ubiquitous in almost every facet of modern civilizations and a constant fixture in Malls, Casinos and diverse areas.

Casinos: the use of the instant inventions in a casino environment has enormous benefits in that the instant invention can be modified to function as a true acceptor and dispenser of precious metal coins for a Hybrid slot machine and all or any wins can be optionally sent, i.e., wired or transferred to someone, from a proximal to distal and/or intermedial location and/or intervening destinations between etc.

The instant invention technology provides the option of dispensing precious metal coins and the ability to accept cash, credit or debit for payment thereof and precious & semiprecious stones used as payment to send and or transfer appropriate value from a proximal to distal location including intermedial locations.

The medium for dispensing such precious coins are common and known to those skilled in the art for instance. BMI gaming manufacturers( or similar machines and competitors and generally known to those skilled in the art) builds and markets a Token Machine dispenser that is fully, programmable allowing tokens with the appropriate dimensions to be loaded into this machine and dispensed according to programmed instructions, price, payment, amount of tokens dispensed etc. Such simple token machines can be reengineered and reprogrammed, modified to accept the dimensions of a precious metal platinum, gold, silver, palladium coins etc., instead and precious metal coins can be dispensed after being paid for.

Optionally, the precious metal coins can be redesigned and tailored to fit the dimensions required normally by the token machine. Precious coins can be inserted and assayed by the Instant Invention machine using methods known to those skilled in the art, including methods to detect the composition of metallic structures such as X-ray Fluorescence means and other electromagnetic detection assay means, chemical biological etc.

Compact portable hand held metal composition assay detectors (guns) and software programs are readily available and can be designed or incorporated into the instant invention machine and are known to those skilled in the art and incorporated by reference herein. Such technology can be built into the Hybrid ATM instant Invention Uncle Gem System. Similar means can be used to assay precious and semiprecious stones and combinations thereof, jewelry etc.

The instant invention & machines allows the choice of sending and receiving, accepting as transferred funds from someone, or entity/organization business cash/debt promise to pay debt currency money, or instead real money, i.e., precious metal, real money, and precious stones, heretofore unheard of being used in an ATM environment and frowned upon. It also allows the trading and payment of such precious metal for internet worldwide web buying and selling, Money transfers and wires, enabling one to send and receive real precious money coins anywhere on the planet and to accept the same for payment and buying and purchase of any item across national and international borders since, Platinum, gold, palladium and silver are universally accepted Globally as currency or real true money.

Currently, there exist Internet companies such as E-bullion and a plethora of others, that purport to allow one to buy, sell or trade in real Precious metal gold etc. globally. However, the gold and other metals are stored in their vaults for safekeeping and the danger of this is that with human nature a Failure of this system is theoretically possible.

In addition as aforementioned, this new technology can be adopted into a casino and its environment, that allows payout of true precious metal real money i.e., gold silver ,platinum, silver coins and semiprecious coins, and even precious and semiprecious stones, for slot machines and black jack, poker, 21 and betting machines and systems. Including the option in the casinos of sending these funds anywhere on the planet and engaging in internet commerce.

The system and instant invention is ideal for EFT or electronic trade exchange funds and can have these needed features available for the masses. In 1995 the U.S. vacated the Fractional reserve system and in the 60s and 70s the country was taken off the Silver & Gold standard.

Currently with the extremely high deficit in the Trillions, our nation is highly vulnerable to economic insolvency, possible currency collapse, hyperinflation and International monetary blackmail. A need for the instant invention as an expedient to current and problematic future economic trends on the horizon now exists.

BACKGROUND OF THE INVENTION

The invention is related to devices used to transfer funds or currency by electronic means. It is well known in the art that the money transfer industry requires an agent, usually a franchised store's clerk accepting cash or credit, and using telephonic or EDI means to transfer funds from one individual at a proximal location to another individual or entity at a distal location. MoneyGram, Western Union, CyberCash and others operate in this fashion.

The invention presented is not limited to requiring a physical person, telephonic means, or EDI based means to accomplish a funds transfer. Instead the invention utilizes a device that should be considered a hybrid apparatus, drawing on aspects of both a vending machine and an automated teller machine (ATM). Both are well known in the art of electronic money handling devices.

SUMMARY OF THE INVENTION

The Universal Automatic Instant Money, Data and Gold Transfer Machine, Uncle GEM II operates like a reciprocal ATM, utilizing a communications network (wired, optical, wireless, or other communications means) to transmit information between a multitude of like devices. The devices, available 24 hours a day, operate interchangeably as sender, receiver, and dispenser of funds. The Uncle GEM/Aunty IM will accept standard currency, i.e., coins and bills, in denominations of $1 to any acceptable amount and the coin acceptors can accept amounts from a penny coin to any amount; fractional amounts of penny or dollar are acceptable. Funds are entered using standard credit and/or banking card in lieu of cash at the device or through a PC over the Internet web page of the Central Database Server (CDBS), by phone, or by means known to those skilled in the art. The Uncle GEM/Aunty IM transmits the funds and/of information through its transfer network that alternatively may have access to any financial institution.

Additionally, an ATM via system modifications can have only a currency or bill acceptor, (an additional coin ingress is optional) can accept and send transferred funds, i.e., cash, through the Uncle GEM/Aunty IM system by an individual inserting currency, whereas the individual need not have any established account at a bank or financial institution, or by accessing the individual's designated financial account through the ATM's network. The benefit of this inventive system is that it eliminates the high overhead of the agents, teller and/or clerks who normally supervise the transfer transactions. The enormous fees arbitrarily imposed by such behemoths as Western Union, MoneyGram and similar entities are greatly reduced or eliminated because a human agent is not required. The other benefit is that the Uncle GEM/Aunty IM transfers funds to individuals, unlike an ATM's one way dispensing of funds and only transferring money to other specified accounts at only one specific financial institution sponsoring that ATM.

The addition of music and music videos, jingles, tunes and movies and the ability to pay for these goods and other services with cash and other means will provide a new dimension to the system and industry.

The instant invention is an improvement over previous devices, methods, and systems used to transfer currency or funds by electronic means. At his or her discretion the user is able to transfer or receive money (using cash, credit, debit or bank cards financial instruments and/or biometrics technology) to a distal location or receive money from a proximal location anytime. The addition of audio, voice-recognition and voice and sound prompts, provides a more versatile universal system. The addition of video and Internet video means, cameras, streaming video and methods known to those skilled in the art adds the ability to talk and see directly with intended recipient and/or designee through video/telephonic or other communication means. This will enable a user of the system to perform most transactions in real-time and generally enhance the transaction as well as increasing safety and security requirements. The use of a visual/video means and a writable screen, pen/write, or digital dynamic pen technology means, further adds authenticity to letters, messages, and documents.

The addition of new and old movies, music and music videos of all types (with the use of an addition of a selection means) provides a unique experience and enhance the money transfer process. Holographic 3D optics, optical, and visual technologies known to those skilled in the art, including icons, holodecks, computer and digital technology can create cyber space virtual agents and/or environments that will help users of the system to accomplish a more secure, low cost, and efficient funds transfer. The instant invention is able to issue postal stamps and virtually any type of money order, including US postal money orders and from virtually any nation or entity globally. Also, the system can be expanded to enable a customer to buy and purchase stamps and money orders from any where throughout the globe, see 2003 Krause-Minkus Standard Catalog of US Stamps, 6th Edition, Official Stamp Collector's Bible 2003, 1st Edition, by Stephen R. Datz incorporated herein by reference, and 2003 US/BNA Postage Stamp Catalog by H. E. Harris & Co., all incorporated herein by reference.

This improved system is capable of accessing and interacting with financial institutions both nationally and globally allowing the machine, method, process, and system to be more robust and universal. The system allows for appropriate currency conversions using the most up-to-date exchange rates, such as the EURO vs. the US dollar, etc., and adheres to the proper government laws and restrictions for different countries. Most conventional ATMs and systems can be redesigned, reengineered, modified, and retrofitted to function as Advanced Automatic Instant Money Transfer Machines or Universal Automatic Instant data/Money and Gold Transfer Machines or Uncle GEM/AAIMTM. The modified system can still possess some basic rudimentary ATM functions if desired.

The improved instant invention allows for easier access by the physically disadvantaged, the multitier features of the instant invention will allow multiple levels of access for those of differing height levels and limitations (physically multitiered and holographically multi-channeled multitiered) also, the automatic self adjusting advanced Aunty IM will allow the face or other relevant crucial features of the machine to automatically (or optional manual feature) adjust to the users height restrictions or height level via sensors and microcontrollers using RC-Servos (Remote Controlled-Servos) stepper machines or other means known to those skilled in the art. Thus making the instant invention truly handicapped accessible, see Practical Electronics for Inventors by Paul Scherz Mcgraw-Hill 2000, incorporated by reference herein.

The instant invention is not limited to telephonic means or EDI based methods to accomplish a funds transfer. The system is not restricted to modems or microprocessors for transmission of information and processing. Optics and opto-electronic technology as well as Internet and satellite communication and other methods known to those skilled in the art may be employed, including DSL, cable modems wireless modems, WiFi or other means known to those skilled in the art. Virtual private networks (VPNs) can be employed. Encryption and other security methods known to those skilled in the art are employed to achieve confidential and secure communications, see: Practical Cryptography by Niels Ferguson & Bruce Schneier Wiley Publishing Inc. 2003; Nanotechnology and Homeland Security by Daniel Ratner, Mark A, Ratner, Pearson Education Inc 2003, 2004; Diamonds by Matthew Hart September 2002; and Diamond, A Journey To The Heart Of an Obsession by Matthew Hart 1945, all the above incorporated herein by reference.

The instant invention is a further improvement to the Automatic Instant Money Transfer Machine (Aunty IM). The ability to transfer cash/data by a human user, offers enormous opportunities, freedom, privacy and new vistas for ordinary people. The Uncle GEMS and Aunty IMs can be remotely accessed and remotely monitored in real time. In addition this method and system/process solves a plethora of problems that are systemic in world and global commerce and especially with the rise of the World Wide Web, i.e., Internet. The instant invention provides humans with a choice to use currency alone or to use other means of payment. The enhanced ability of the instant invention to accept and transfer currency by itself with either one-bill acceptor or with multiple bill acceptors and multiple dispensers will provide humanity a more robust system to engage in global commerce. The enhanced ability of the instant invention to accept coins and alternately employing an enhanced/modified coin acceptor or a plurality of coin acceptors/dispensers, to accept gold and silver coins, and other precious metal coinages and combinations thereof, including platinum/palladium and other precious metals. provides new opportunities and freedoms for humanity. The usual standard conventional coins (copper, nickel, etc., coinage) will still be accepted. However, combinations of precious and semiprecious metals and related instruments such as stones including, diamonds, emeralds, topaz, tanzanite, pearls, rubies, etc., are also acceptable. In the past these and other precious and semiprecious stones have been substituted and used for currency and commerce. The use of and trade in gold coins, silver coins and other precious metal instruments (and precious and semiprecious stones) is a specialty market that currently does not have a reliable means for efficient buy/sell/trade transactions and would be competition with the global paper and credit based financial infrastructure.

The objective of this invention embodiment is to enable the aforementioned and to allow people the means and choice to accept alternative payment options, i.e., gold, silver, and other metallic coins and/or precious stones to easily purchase and sell online goods and services as well as virtually any item globally, using the instant invention. In essence the buying and selling or purchase of goods and services using gold and silver including bullion has been an option for the super rich for quite awhile. However, there was not a means and market for the middle class and even relatively poor people who at times have had and do possess gold coins and such. The instant invention will enable these people to engage in normal global commerce using the aforementioned or paper currency and not have to be restricted to middlemen and pawn shops. The incorporation of precious metals coins is an effective expedient in the probable event of insolvency, super inflation and hyper inflation and can avert and prevent future global financial collapse due to paper currency failures.

Also, the instant invention's capability to transfer send and receive gold/silver coins can in itself serve as a solution to prop up or buttress and counteract faltering currencies in times of national disasters, war, famine and political economic instabilities. The instant invention itself will provide a solution to many developing and modern countries' economic ills, see 2004 standard Catalog of World Coins by Chester L. Krause and Clifford Mishler 1901-present 31st edition incorporated herein by reference. A truly practical method means and processes are herein described that will facilitate and enable a person to buy and/or select goods and services on-line or shopping using the Internet and similar means. Enabling online shopping by and through any communication means available and with cash, gold, silver, or other precious metal coins, cash and financial instruments, as well as normal means such as credit/debit cards and Visa or MasterCards, smart cards and other financial instruments. Consumers can send data and purchase products, goods and services, such as, music, music videos and movies, as well as participation in buying and selling on Ebay and other auctioning sites and paying for these goods and services, including using barter and barter type trades/systems, by using the Uncle GEM/Aunty IM.

The instant invention provides a solution or expedient to the rampant piracy and outright theft, misappropriation of movies and music, the latter involves misusing MP3's, file sharing and other formats like peer to peer (P2P) and other means. These problems can be minimized using the instant invention. Outfits such as Napster, Kazaa and others have come under fire by the RIAA, even Apple Computer's system, the Apple iTunes Music Store (apple.com/music), which is hampered by the inability of the masses to pay easily and practically for its services with cash/currency. However with the Aunty IMs and Uncle GEMs, the problem can be addressed and solved, thereby enabling the masses to easily buy/sell and more readily purchase goods and services on-line and participate in the global economy, including Ebay, barter methods and systems and other auctioning sites as well as purchasing telephone cards and generally any goods and services in real-time with real currency or cash or alternatively with gold coins, silver coins and other precious metals and similar instruments. A human being now has a robust simple and practical means of transferring money/data and the option of paying for what they want in cash with a machine that has a bill ingress only or alternatively using standard coins and optionally gold, silver, and platinum coins and other precious metals, in contrast to having to be credit worthy.

In principle, by using cash or gold, silver, platinum or even diamonds, virtually anything can be bought, purchased, bartered, traded or sold, including, land, property, businesses, etc., The machines can be equipped optionally with customer service phones and with video means. Including real-time instant video stream of help desks or experts who can assist in assay of precious/semi-precious metals and precious/semi-precious stones. This will assist along with electronic/optical/chemical/physical methods and other methods known to those skilled in the art to properly and further authenticate these methods and forms of payment.

The machines can optionally possess defensive and offensive capabilities in the unfortunate event of attempts at theft. The system/machines and all transactions can be remotely monitored by local police, and government agency's, NSA, etc. The defenses can be electromagnetic, laser, chemical, biological, kinetic weapons, rifle, submachine gun, pistol or cannon. Also, EM shielding methods can be employed including bending of light for invisibility and possible anti-gravity capabilities. Electromagnetic Identification means especially of items emitting EM signals can be employed, virtually any wavelength, frequency on the Electromagnetic spectrum can be scanned and detected by the instant invention. Nuclear capabilities are not allowed by the U.S. Government. In fact robotic capabilities can be incorporated so that the machine could actually move, roll or walk away (flight is possible) if threatened. This robotic ATM could have the Advanced Aunty IM ATM/Uncle GEM built into its units and could be capable of mobility/flight and could be armed if desired by local law enforcement, see The Age Of Spiritual Machines: When Computers Exceed Human Intelligence by Ray Kurzweil 1998, 1999, incorporated herein by reference. see Natural-Born Cyborgs by Andy Clark, Oxford Press 2003 incorporated herein by reference ,see Engines of Creation by K. Eric Drexler 1986-1990, Anchor Books edition, incorporated herein by reference.

Financial instruments such as smart cards, and smart card burners and/or the means to replenish and reload these cards can be employed in fact these cards are commonly used as substitutes for cash or coins. Any type of credit card can be used including, Visa & MasterCards, Smart cards and Debit cards can be used including the ability to replenish and/or reload these Smart cards and Debit cards with the permission, blessings of the owner or Bank/financial institution or entity, matricula cards are ok Therefore, all humans do not have to belong to a bank to buy and sell. Such ancient institutions can at times be good and benevolent; unfortunately, they also can be oppressive and stifle human progress. By the very nature of creditworthiness, this sometimes can restrict and keep out the masses of people on the planet, see article If You Are Poor, Banks of the Future May Not Want You Bank Monitor, 1999, incorporated by reference herein. The banking system seems to not really want the masses of poor people and it may be that the banking structure or system was originally invented and designed for the elite few. Now that mankind has evolved and the earth is teaming with over 6 billion people (approximately 8 billion by 2005) most of which are poor and the World Wide Web, i.e., net has been created. What is needed now and is required is a robust means of allowing all humans to participate and buy goods and services from the Internet if they so desire, using their own hard earned money, i.e., cash or precious metals, to buy/sell and not be required to pay excessive fees to middleman, i.e., Western Union, MoneyGram or unfriendly banks. The latter should only be an option used if the buyer/customer chooses to and if Banks truly wish to help them buy/sell. One interesting analysis and observation is that in considering the financial potential of nearly 6 billion people who do not possess credit and/or do not belong to a bank, and if theoretically, each separate individual has cash money or precious metals, then each contiguous discrete individual could be considered a temporary bank or virtual bank that is liquid or solvent for the total amount that they are willing to transfer or spend.

The Multitier Auto-Positioning Universal Automated Instant Money, Data and Gold Transfer Machine, Aunty IM will enable universal access and use of the instant invention as well as allowing ease of use and access by the physically challenged, disabled and/or handicapped. Analog/digital micro-controllers and servo motors/servo mechanisms and means known to those skilled in the art can be employed as well as electromechanical and electro-optical means, bionics, and programmable, computer controlled, etc. The instant invention can be made to automatically or be manually aligned or leveled. The advanced ATM instant invention unit and functions and features can be positioned to the desired proper level height or reach of the user (or rotated and made to assume virtually any desired level or angular position desired for ease of access and reach by the user) so that the user can more easily interact with the system. Sensors on the Instant invention and automatic positioning/leveling devices and means known to those skilled in the art, can properly position any and all of the features either manually or automatically so that the relevant features i.e. keypads, touch screen and input/output devices are easily accessed by anyone regardless of their height or physical limitations. The auto positioning features can be remotely accessed and activating from external regions/distances (programmable) and upon approach by the intended user or by the instant invention units sensors and Automatic control mechanisms as well as being able to be repositioned and/or reconfigured by onboard means, see Feedback Control Systems. Also, the need for a multitiered approach or multiple areas of access can be addressed using holographic technology s be it on-axis or off-axis.

However, the on-axis holographic approach is more dynamic and practical as well as compact consider the inventors previous Pat. No. 5,369,511, Methods Of and Apparatus For the Manipulation of Electromagnetic Phenomenon, 1994 by Carl R. Amos incorporated by reference herein and the patent application entitled Advanced Methods and Apparatus For The Manipulation Of Electromagnetic Phenomenon. The use of these marvel improvements in the art and science of holography and 3-D dimensional imaging technology will allow for 2-D and 3-D images that can be projected into space and interacted with merely by touching the projected image. The inventors on-axis holographic technology can improve the existing 3-D interactive technologies, see Holotouch patent Holographic Control Arrangement by Robert D. McPheters U.S. Pat. No. 6,377,238 2002, incorporated herein by reference. This is primarily due to the fact that the latter holographic projections are limited by the inherent limitations and use of off-axis holography which by it's very nature is dependent on angular separation for creation/replay and only a close or near approximate alignment of the projected image with the source image(s) and of the medium or source and reconstruction or replay purposes is attainable. The instant invention uses on-axis dynamic holograms which are truly compact and on-axis providing 360 or 180 (hemisphere field of view) for a direct compact image that can be projected anywhere and is an exact replica and perfectly aligned with the source and not limited, Also, without double images and the inherent zero-order limitations of off-axis holography, see: Robot Builders Bonanzaa, Second Edition, Gordon Mcomb, Mcgraw-Hill, 2000; Newton's Telecom Dictionary by Harry Newton, CMP books, 2003; Internetworking technologies Handbook, Second Edition, Kevin Downes, Merilee Ford, H. Kim Lew, Steve Spanier and Tim Stevenson, Cisco Press MacMillan Technical Publishing, 1998, by Cisco Systems Inc.; Multiprotocol Network Design and Troubleshooting by Chris Brenton, Network Press Sybeck Inc., 1997; Visual C++ Distributed, James M. Lacey, The CoriIolis Group, 2000; Practical C Programming, Third Edition, by Steve Oualline, O'Reilly, 1997, all the above incorporated herein by reference.

BRIEF DESCRIPTION OF THE SEVERAL
VIEWS OF THE DRAWINGS

The following illustrations of the system architecture and the means are not limited thereto other embodiments known to those skilled in the art providing efficiency can be employed. The patent or application file contains at least one drawing executed in color. Copies of this patent or patent application publication with color drawing(s) will be provided by the Office upon request and payment of the appropriate fees.

Figure 1:
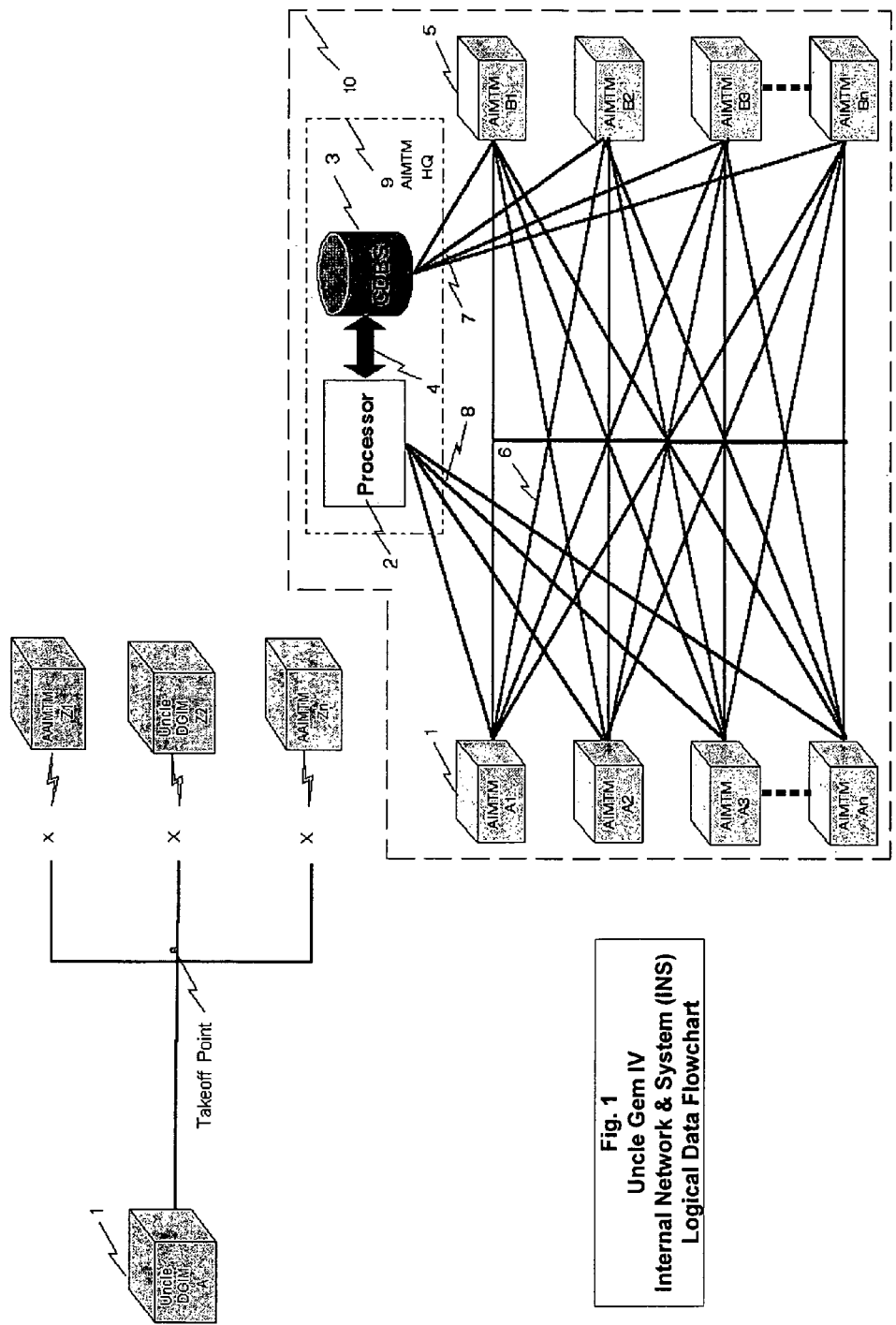

FIG. 1. Uncle GEM/AAIMTM Internal Network Logical Data Flowchart details the data elements of the system.

Figure 2:
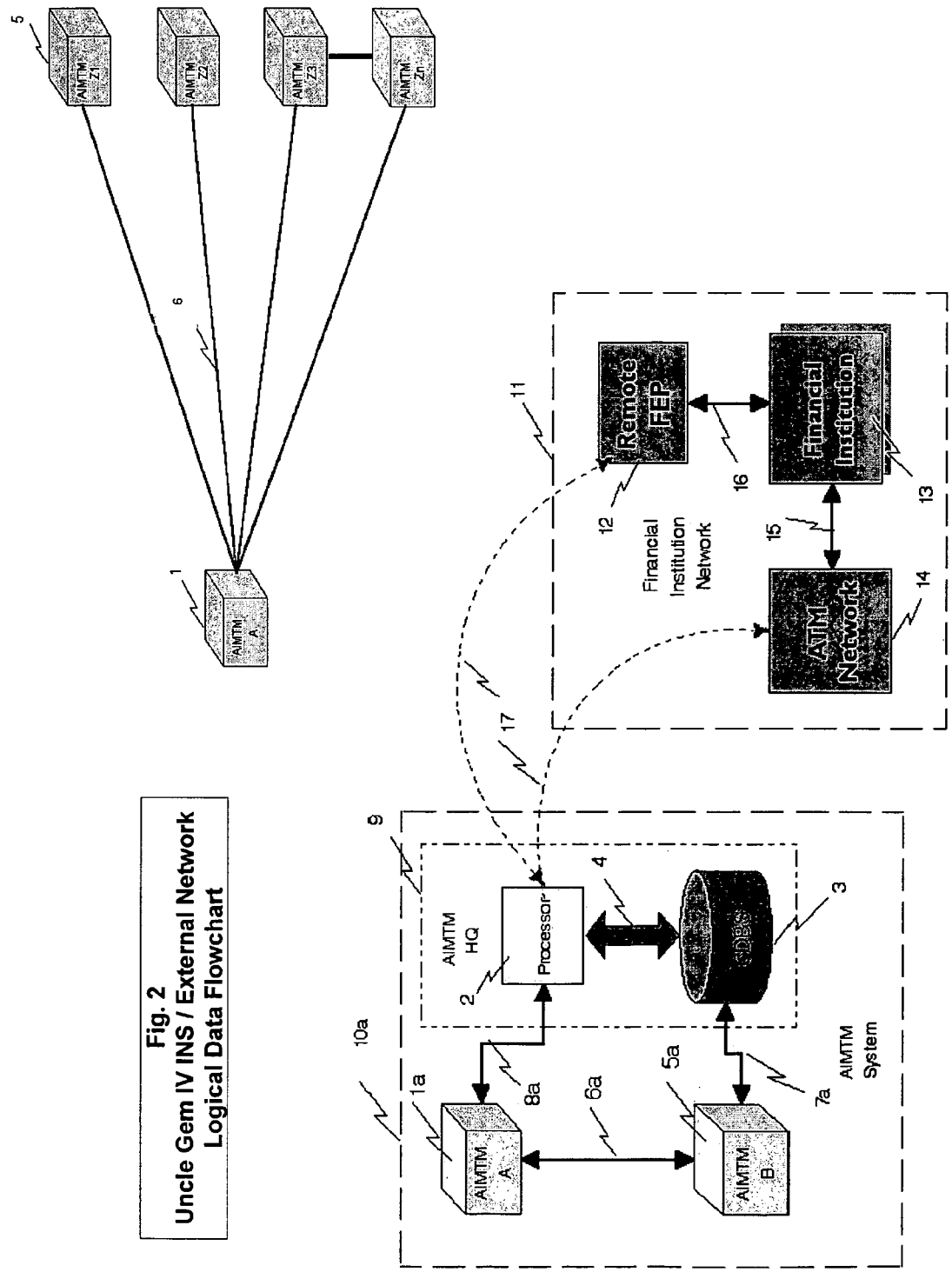

FIG. 2. Uncle GEM/AAIMTM/External Network Logical Data Flowchart details accessing an external network.

Figure 3:
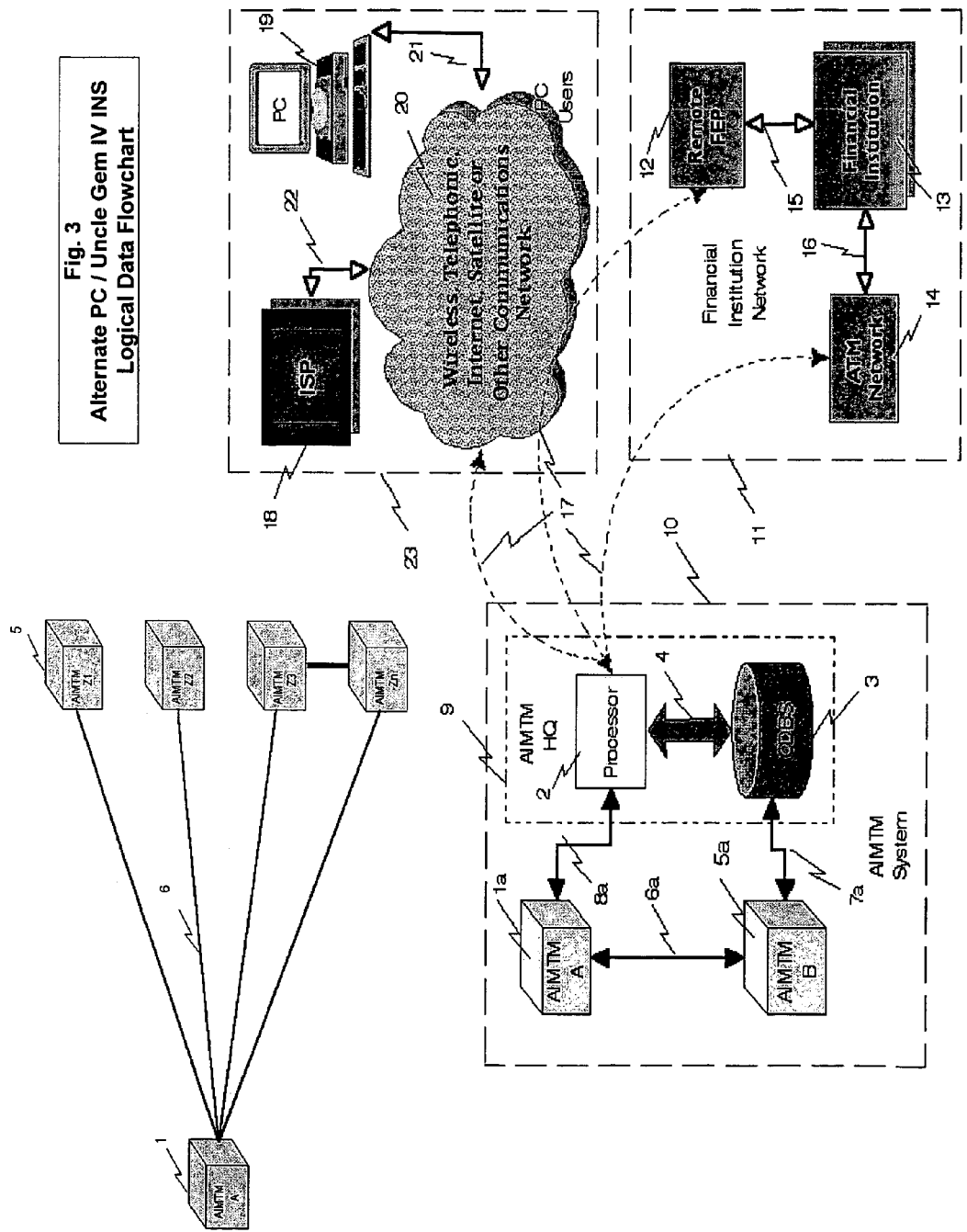

FIG. 3. Alternate PC/Uncle GEM/AAIMTM INS Logical Data Flowchart details access by a PC or similar device.

Figure 4:
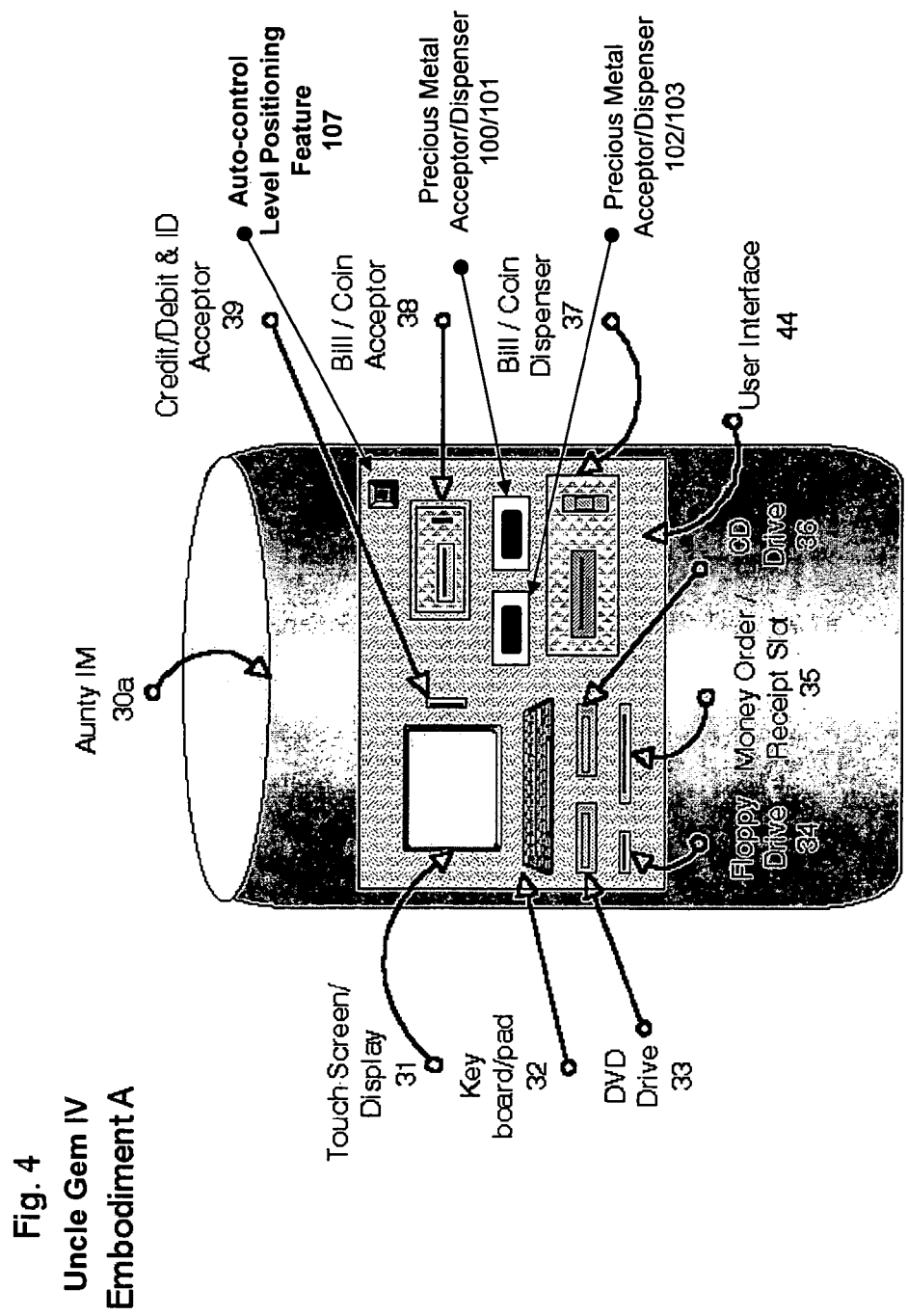

FIG. 4. Advanced AIMTM Embodiment A depicts a basic Advanced Automatic Instant Money Transfer Machine with auto-control level positioning sensors/mechanism and features and with optional Multi-channel Holographic I/O touch features and means.

Figure 4B:
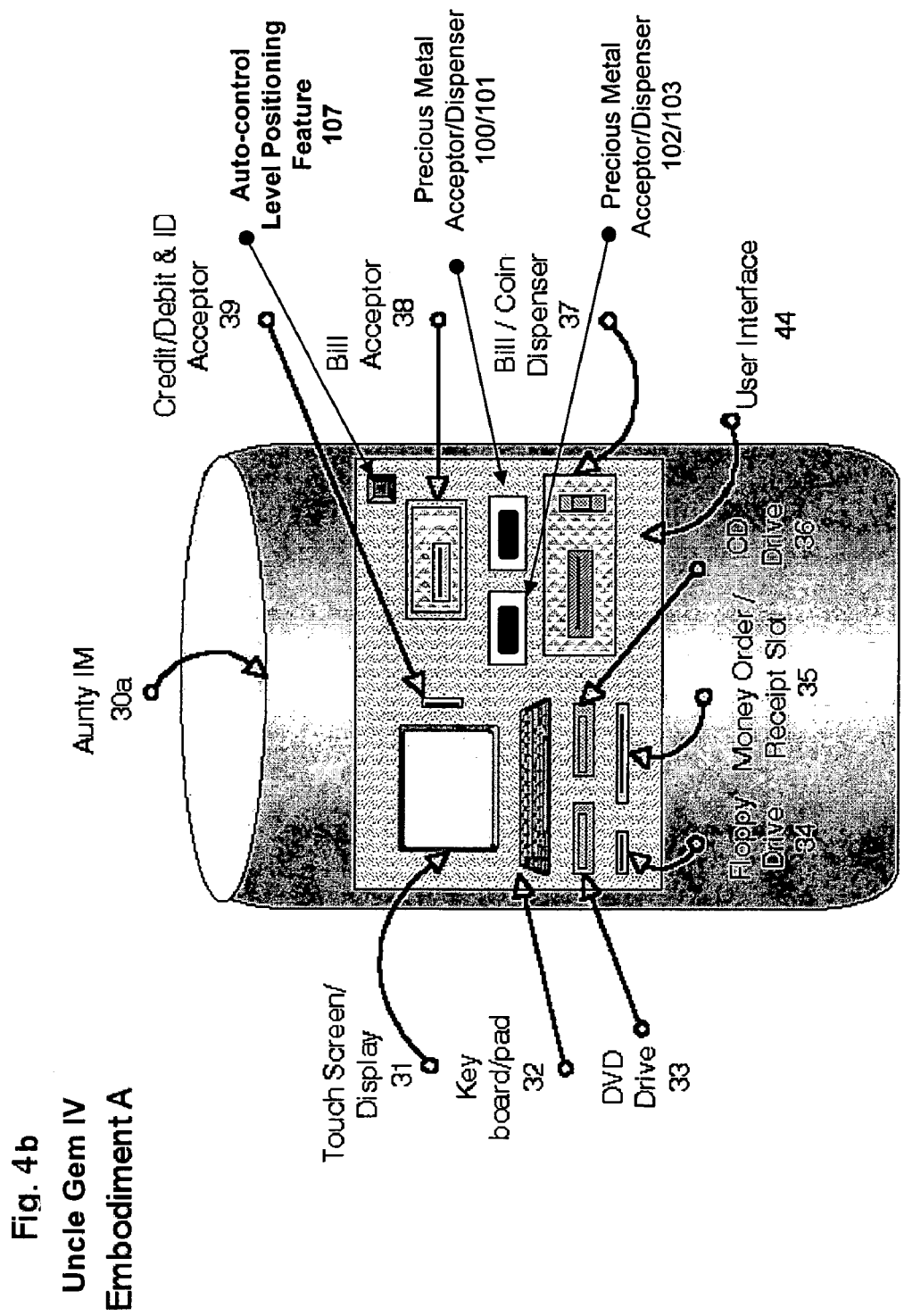

FIG. 4b. Advanced AIMTM Embodiment A depicts a basic Advanced Automatic Instant Money Transfer Machine comprising a bill acceptor and a bill/coin dispenser.

Figure 5:
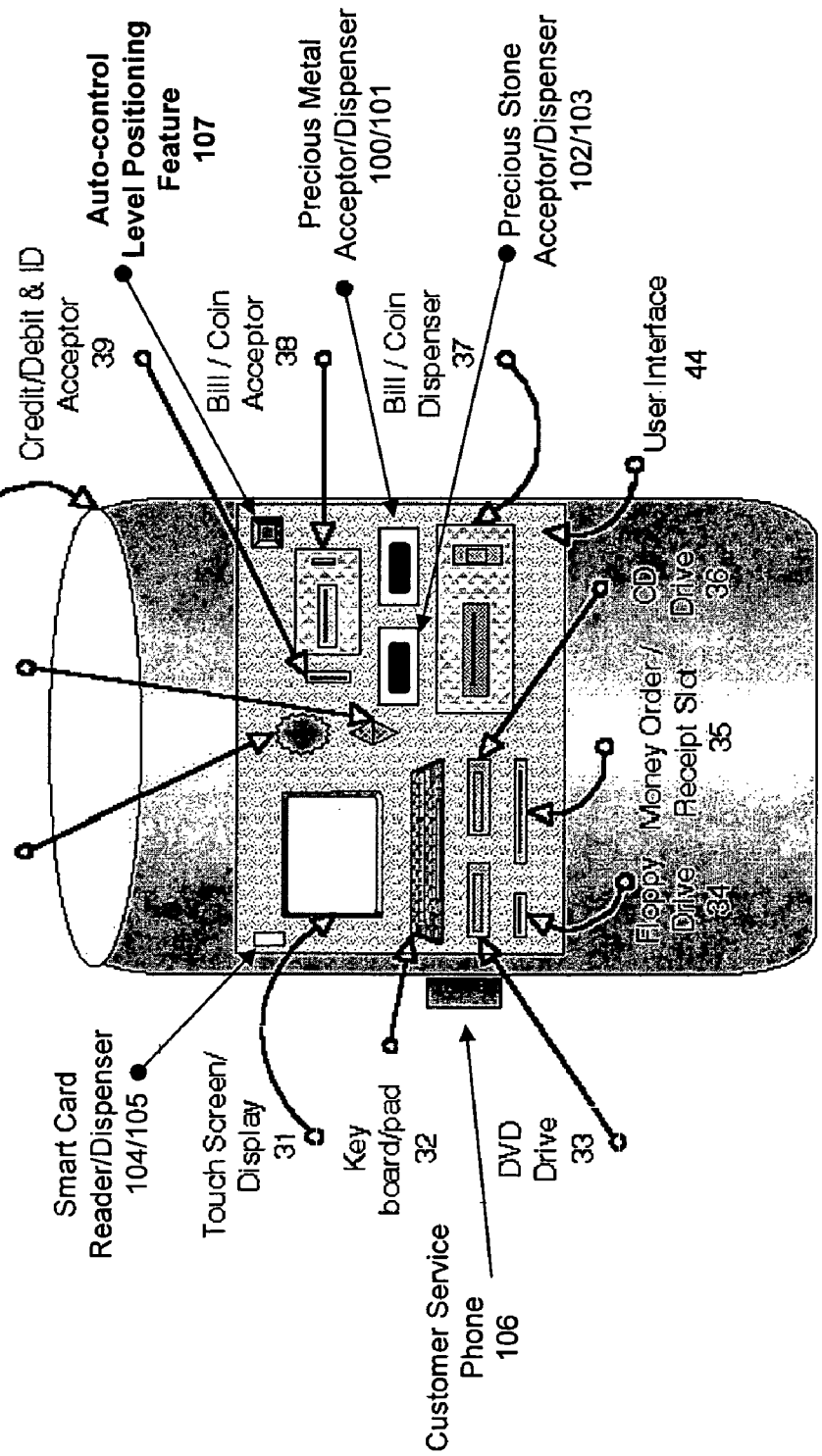

FIG. 5. Advanced AIMTM Embodiment B is an illustration of an Uncle GEM/AAIMTM with a speaker and microphone with auto-control level positioning sensor/mechanism and features and with optional Multi-channel Holographic I/O touch features.

Figure 6:
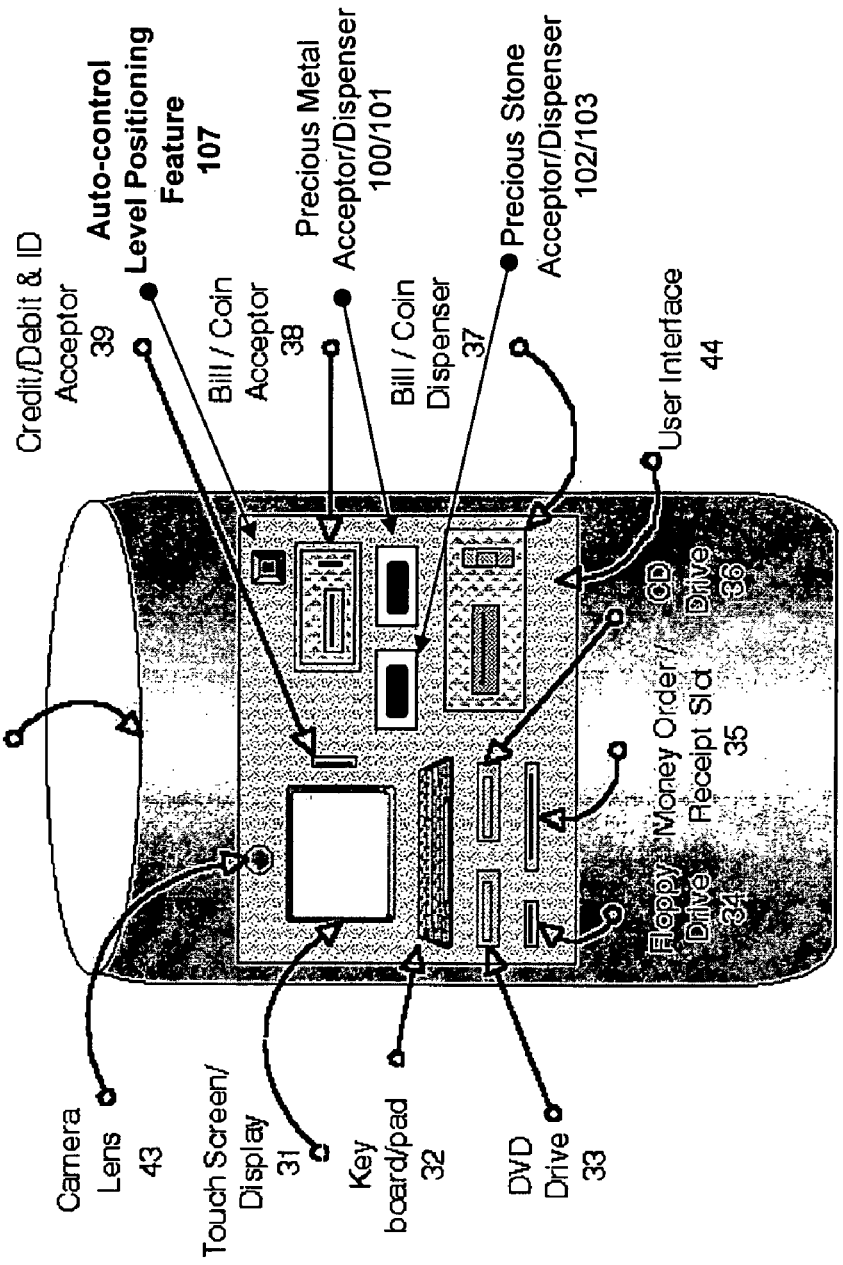

FIG. 6. Advanced AIMTM Embodiment C is an illustration of an Uncle GEM/AAIMTM with a camera lens with auto-control level positioning sensor/mechanism and features and with optional Multichannel Holographic I/O touch features.

Figure 7:
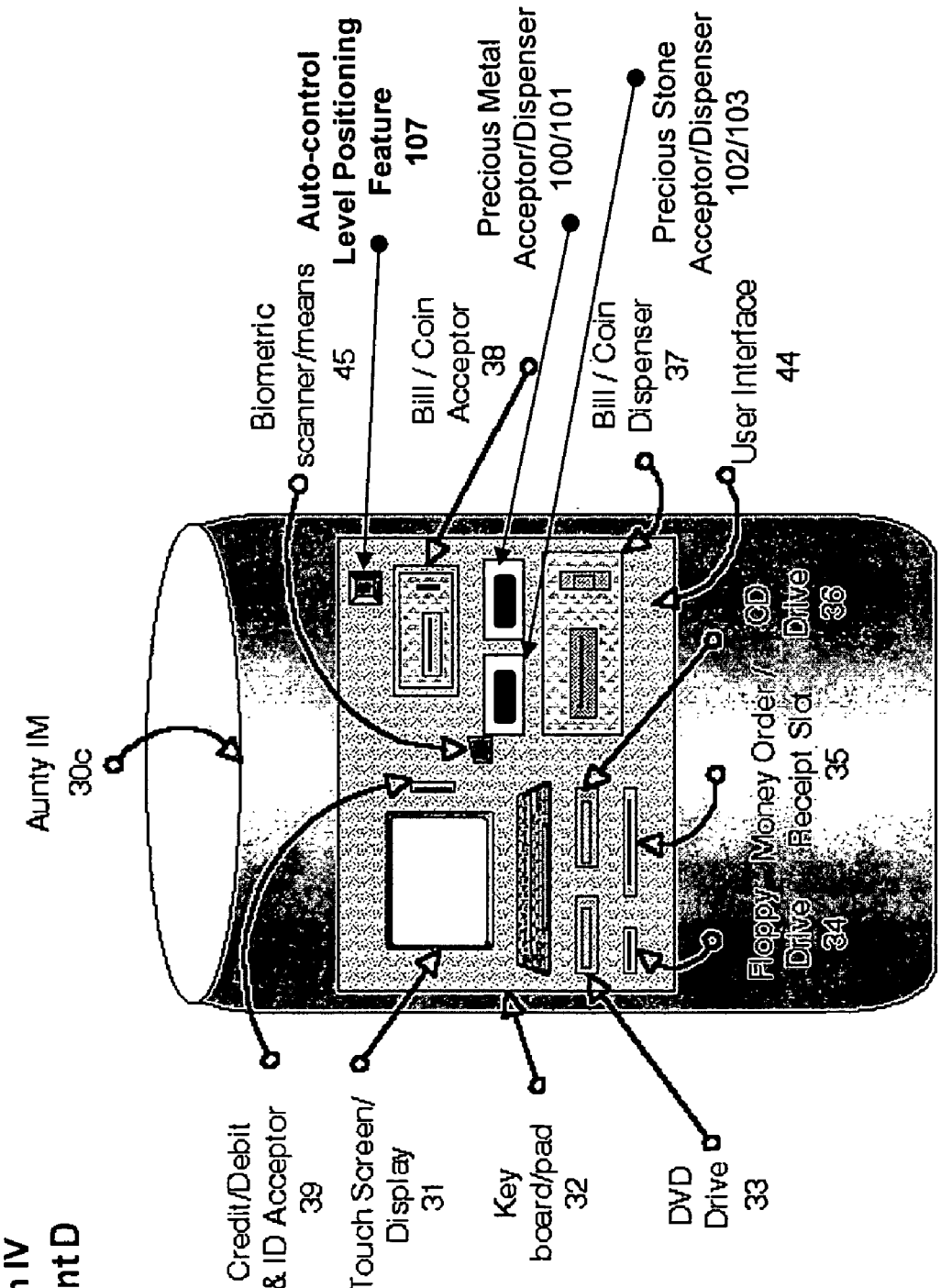

FIG. 7. Advanced AIMTM Embodiment D shows an Uncle GEM/AAIMTM with biometrics scanning and biometrics means with auto-control level positioning sensor/mechanism and features and with optional Multi-channel Holographic I/O touch features.

Figure 8:
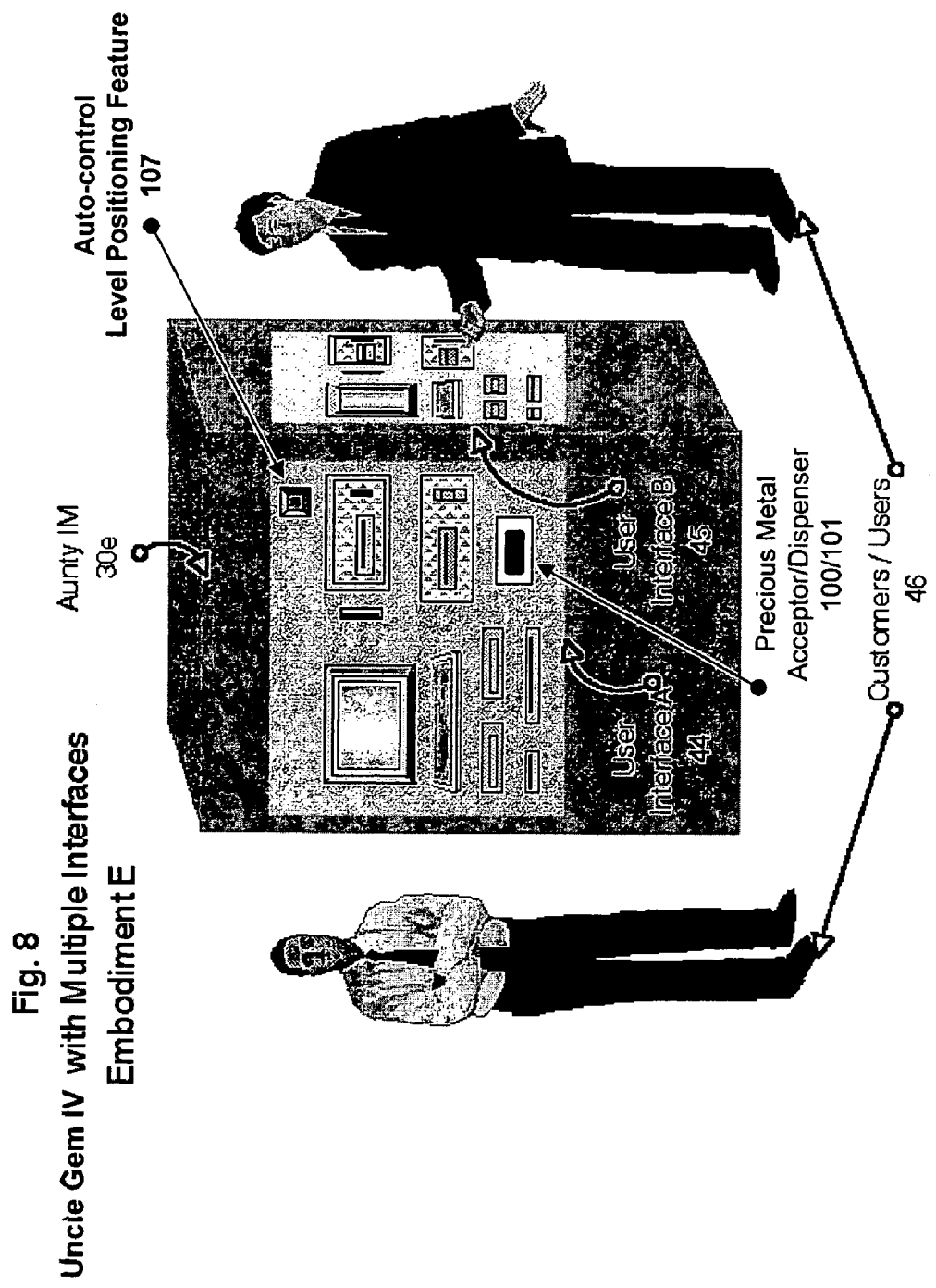

FIG. 8. Advanced AIMTM Embodiment E shows an Uncle GEM/AAIMTM with multiple interfaces and with optional auto-control level positioning means and sensor/mechanism features and with optional Multi-channel Holographic I/O touch features.

Figure 9:
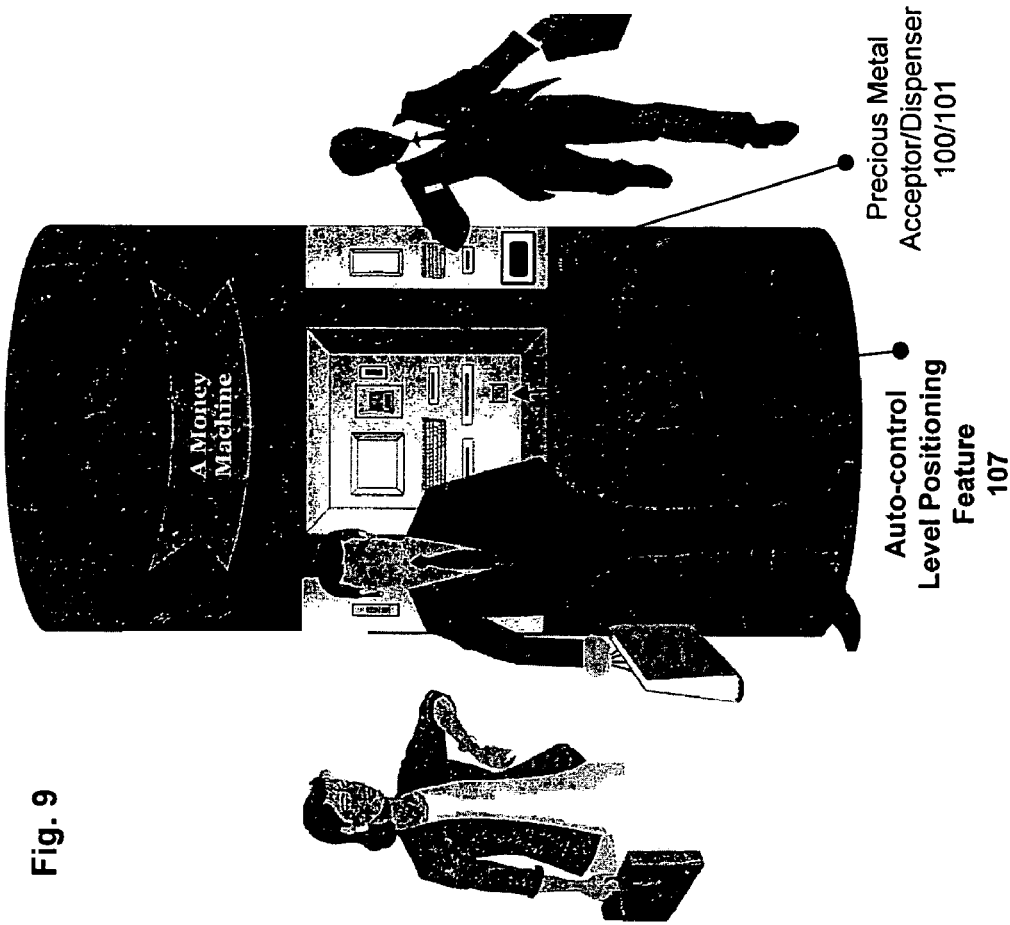

FIG. 9. Advanced AIMTM Embodiment E depicts another instance of a multi-access Uncle GEM/AAIMTM. with auto-control level positioning means and sensor/mechanism features and with optional Multi-channel Holographic I/O touch features.

Figure 10:
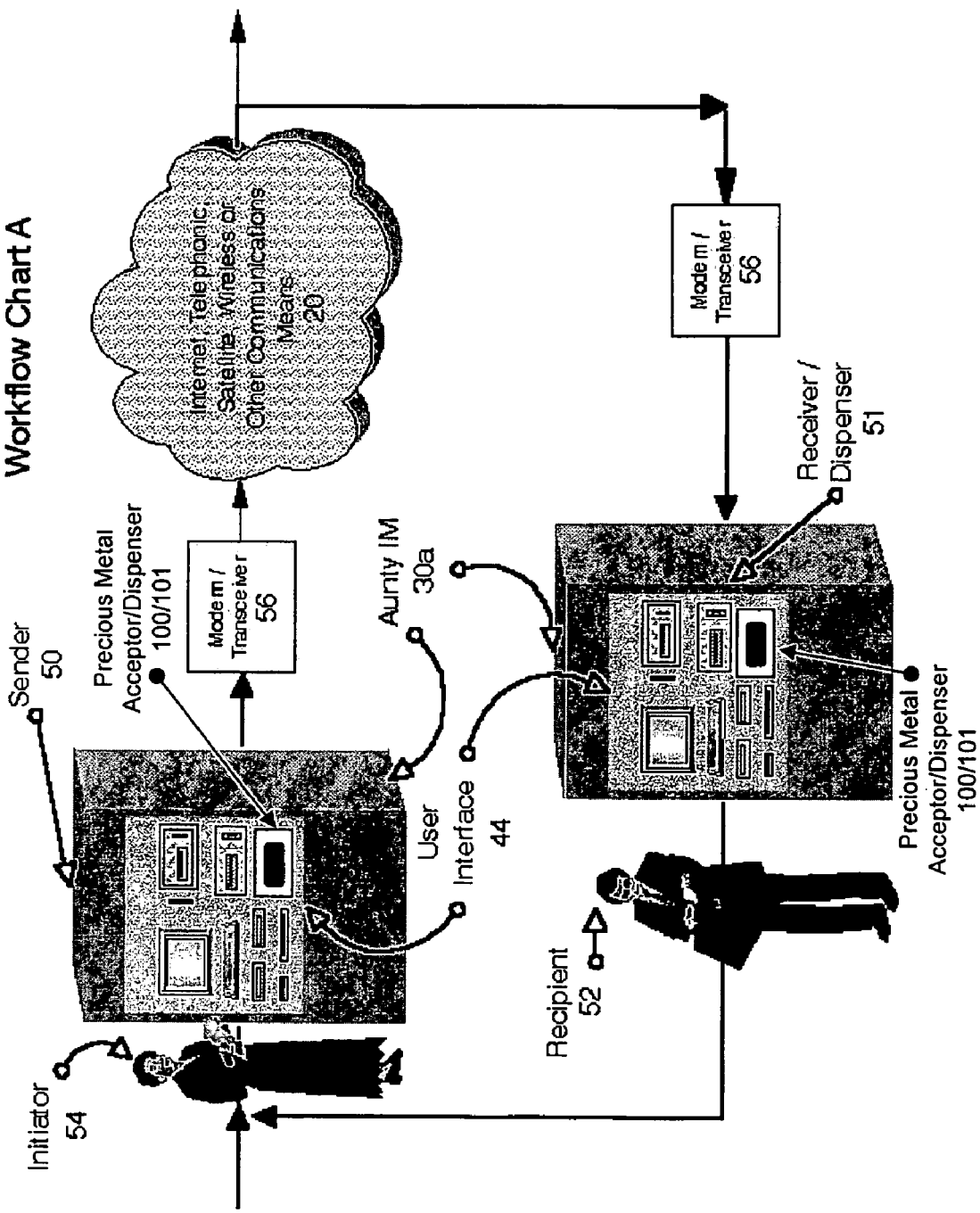

FIG. 10. Workflow Chart A is an illustration of Uncle GEM/AAIMTM system processes.

Figure 11:
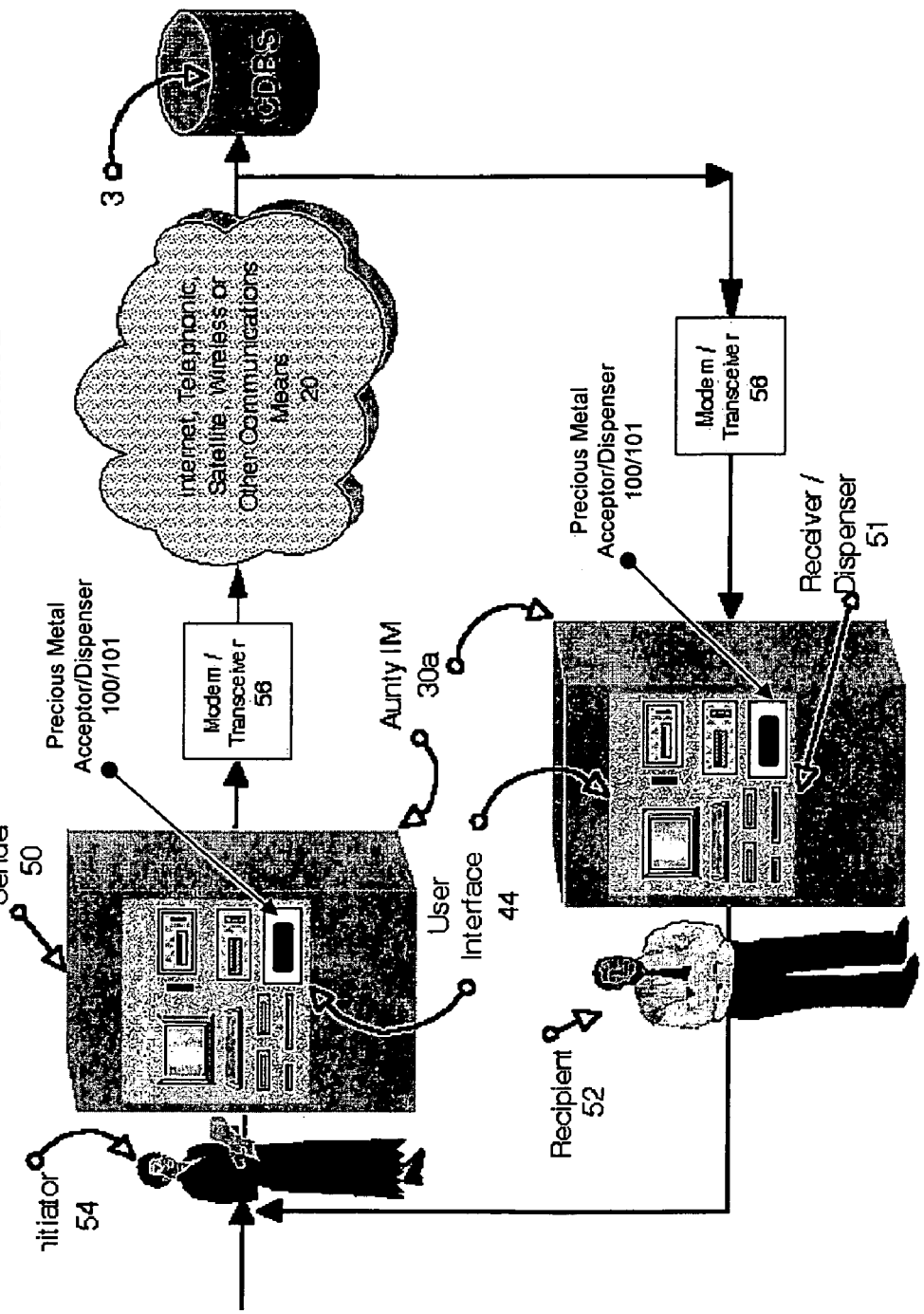

FIG. 11. Workflow Chart B is an illustration of the Uncle GEM/AAIMTM system interacting with its Central Database Server.

Figure 12:
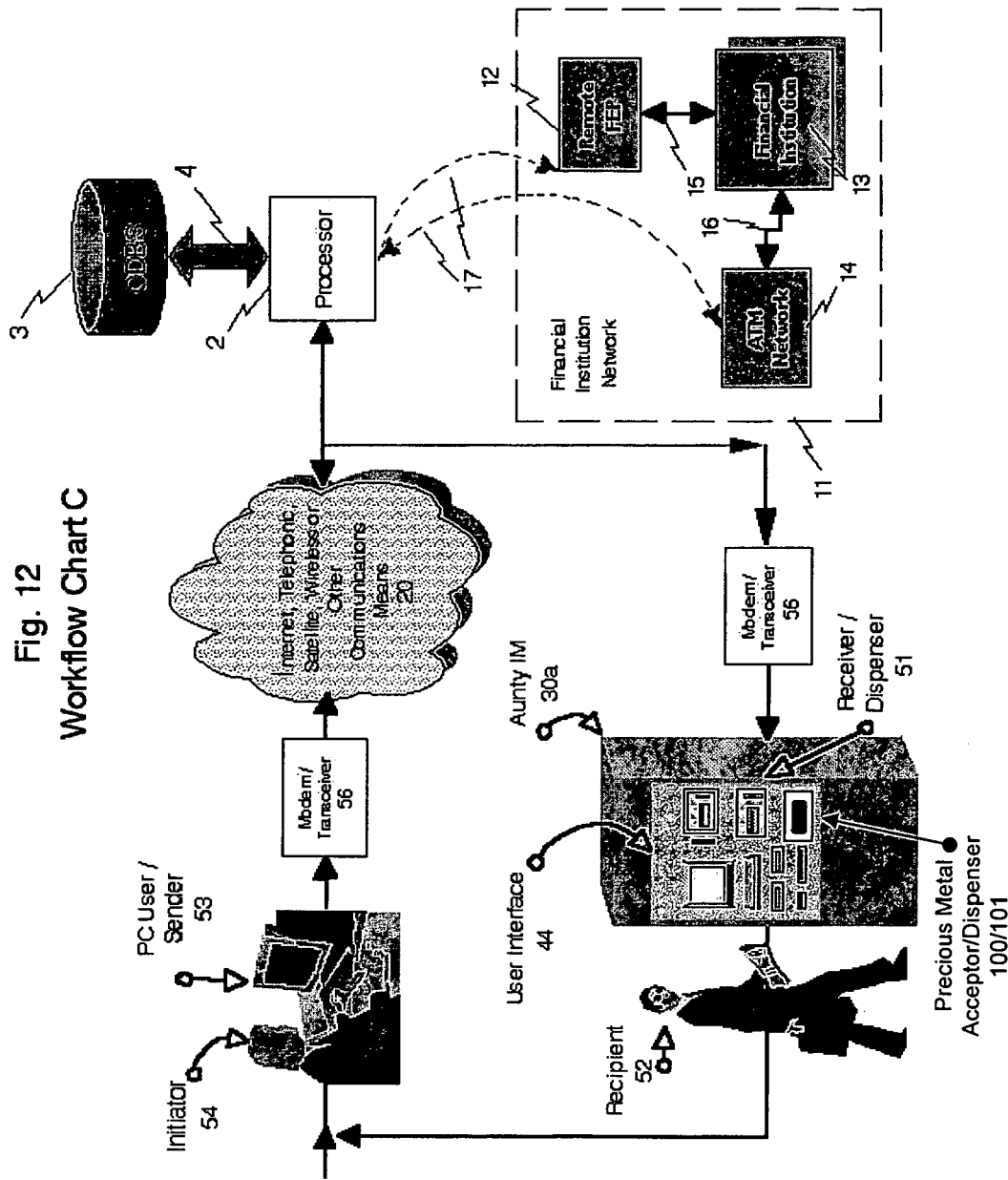

FIG. 12. Workflow Chart C illustrates the Uncle GEM/AAIMTM system interacting with an external financial institution's network.

Figure 13:
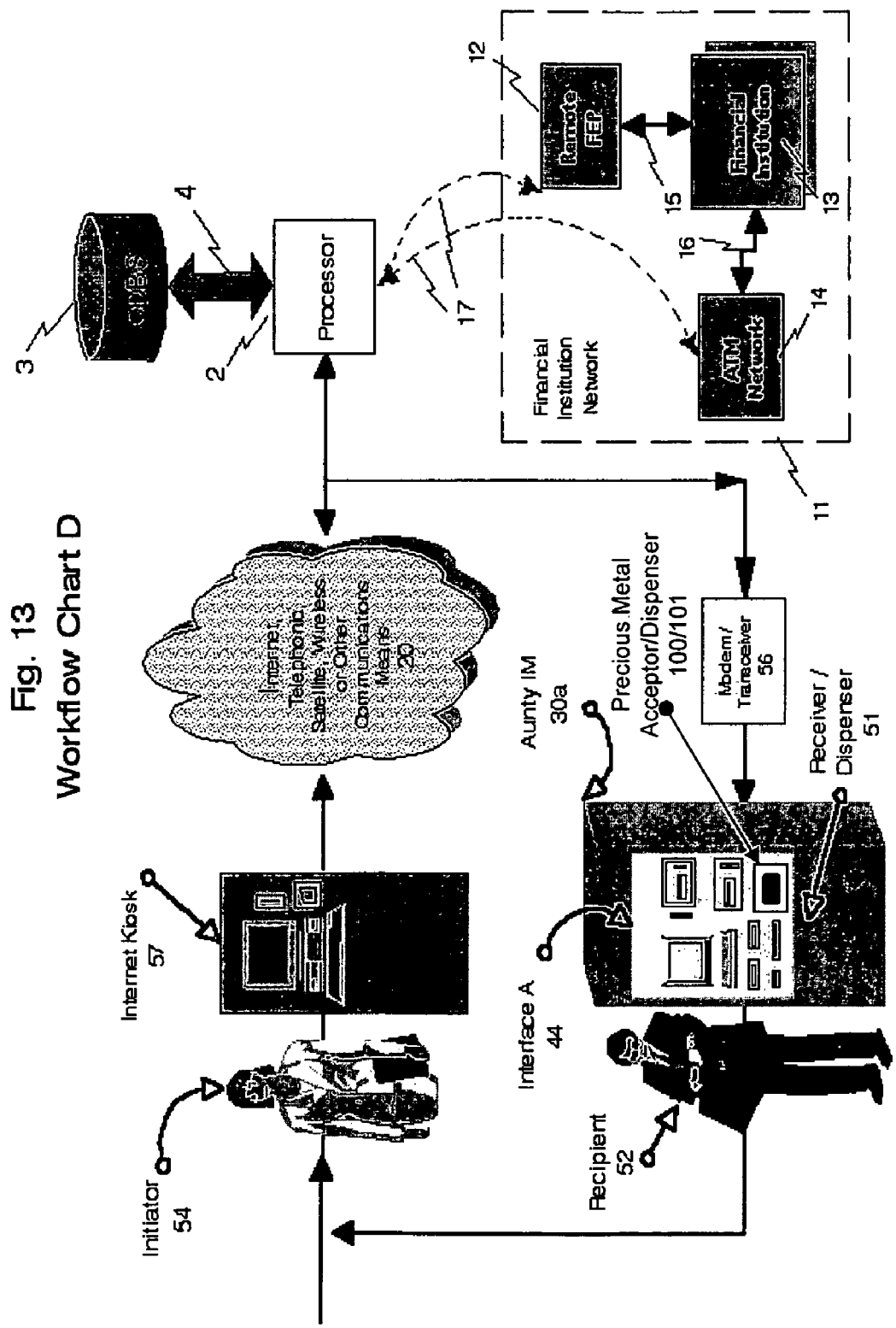

FIG. 13. Workflow Chart D illustrates the Uncle GEM/AAIMTM system interacting with a standalone Internet kiosk.

Figure 14:
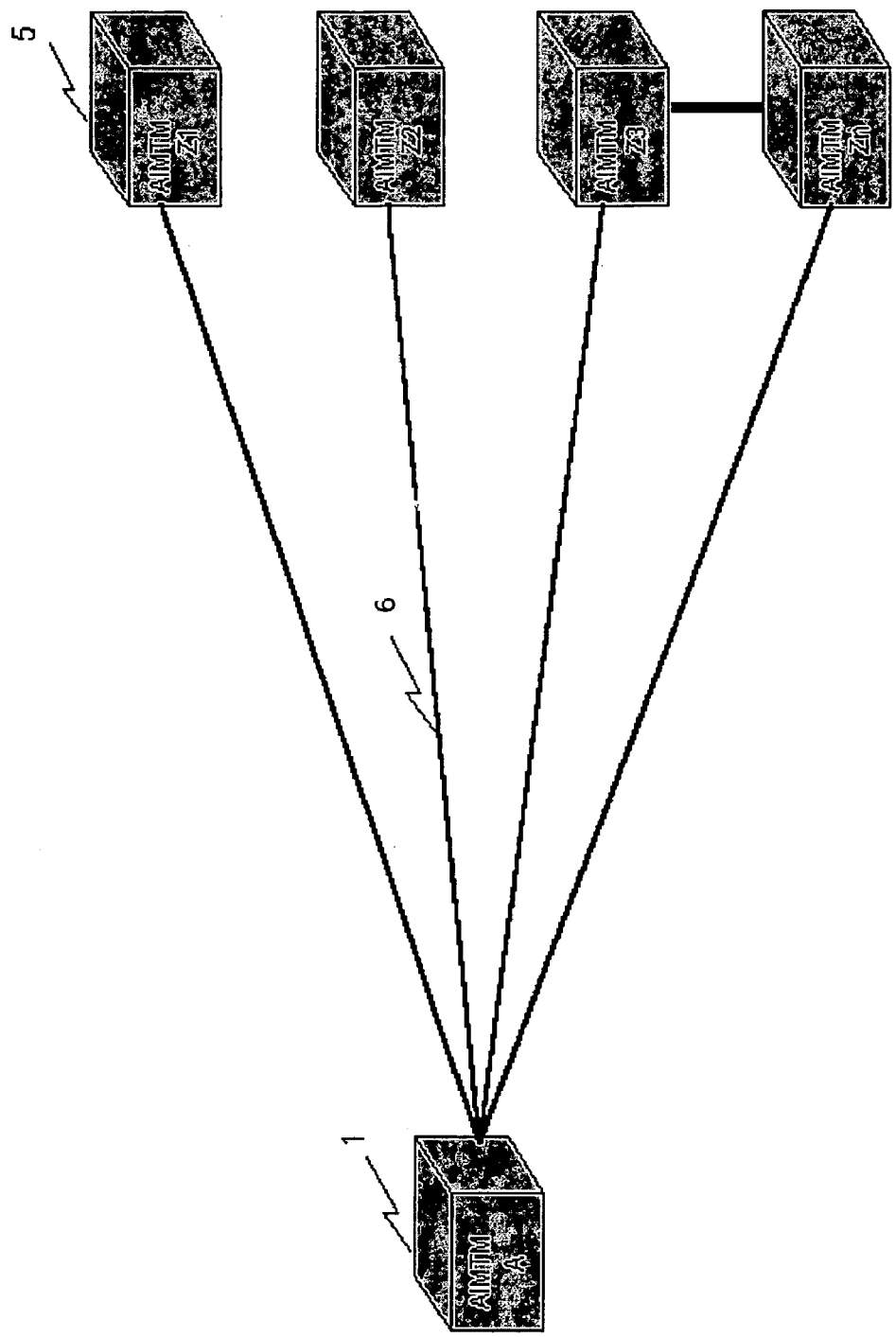

FIG. 14. This illustration is of the Universal Automatic Instant Money, Data and Gold Transfer Machine Logical transmission Signal Flow Graph.

Figure 15:
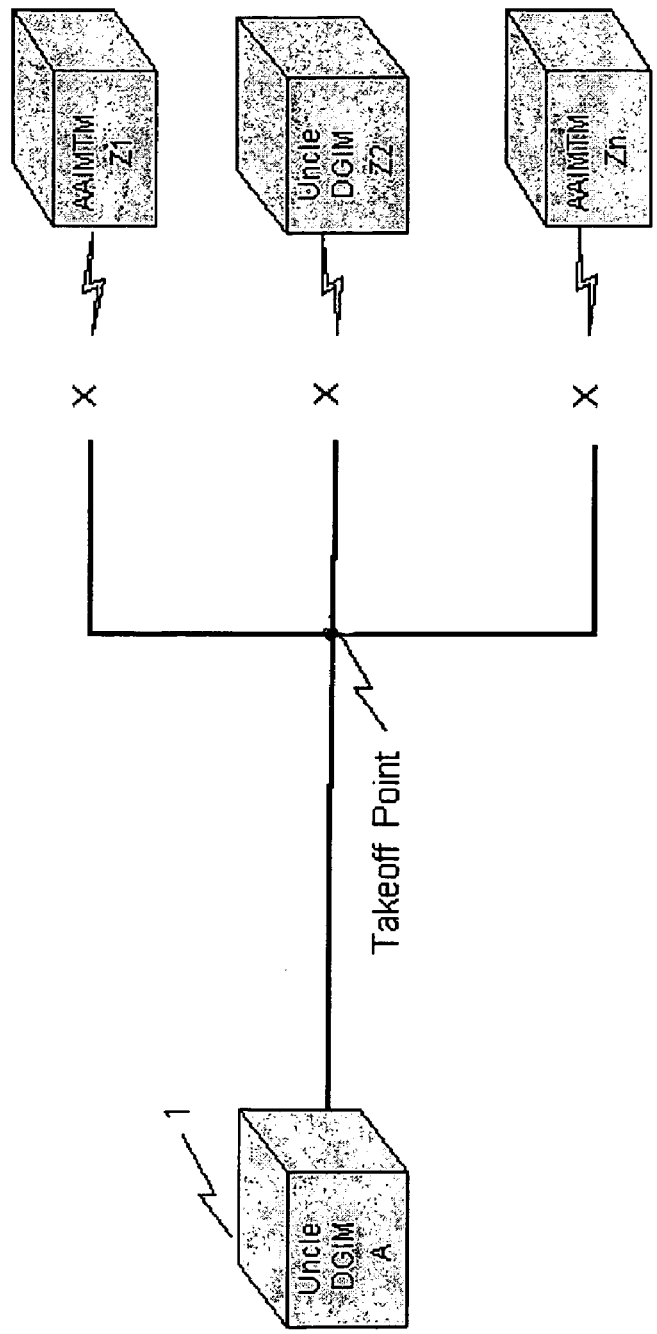

FIG. 15. This illustration is of the Universal Automatic Instant Money, Data and Gold Transfer Machine Logical Signal Control System Flowchart.

Figure 16:
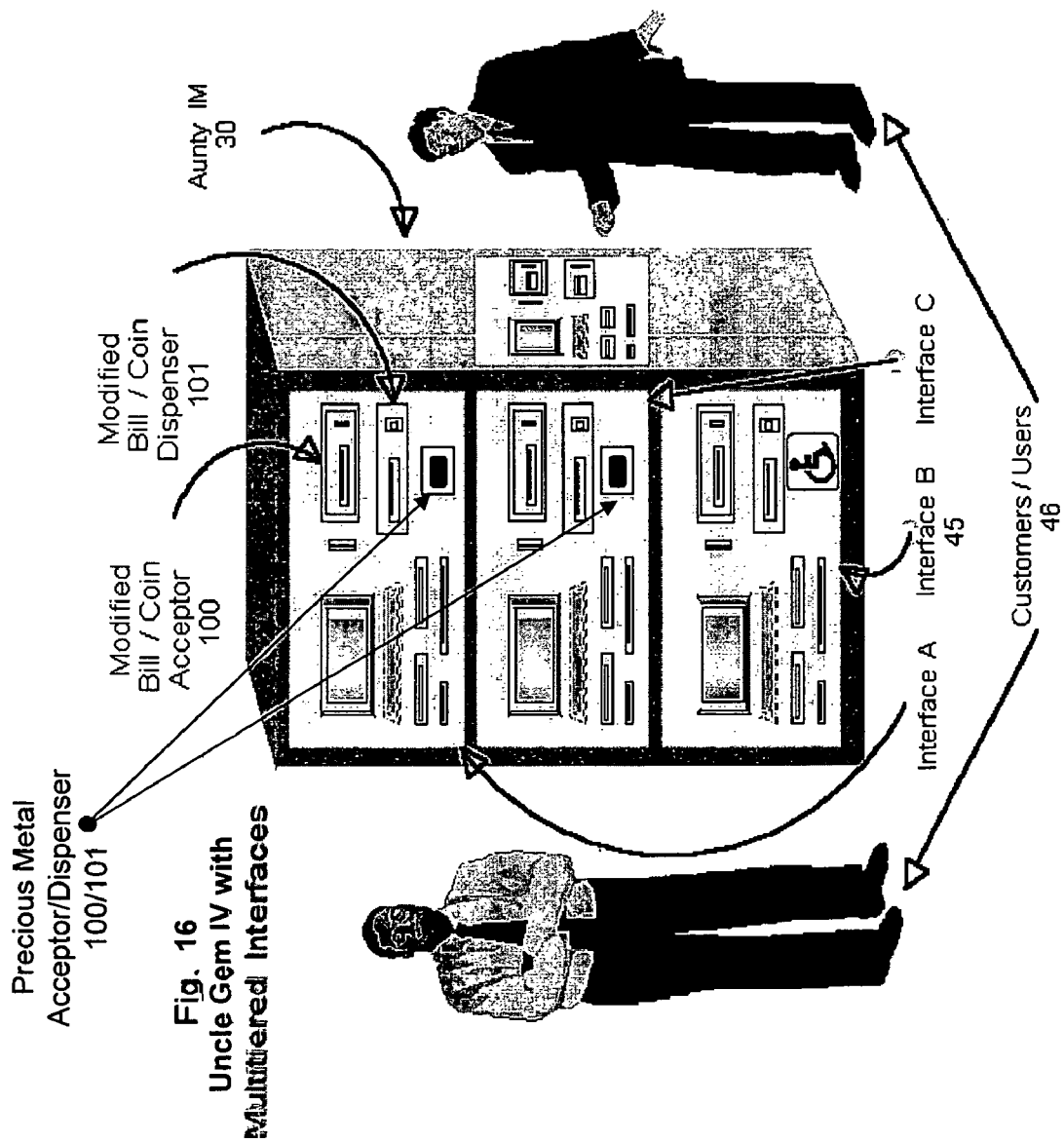

FIG. 16. This illustration is of Uncle GEM/AAIMTM with multitiered Interfaces and optional auto-control level positioning means and sensor/mechanism features.

Figure 17:
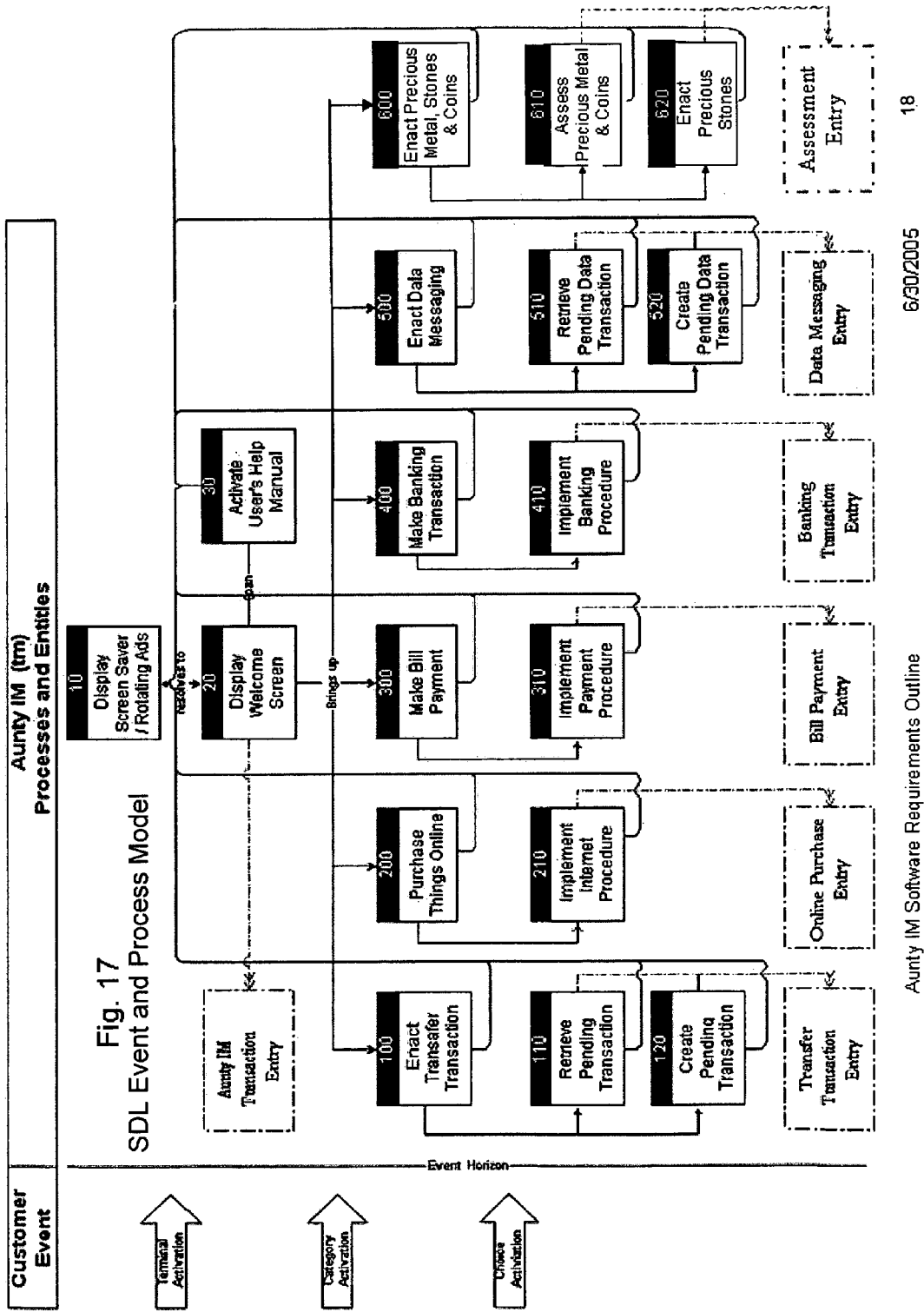

FIG. 17. This illustration is of the Uncle GEM/AAIMTM (UML) SDL Event and Process Model.

FIG. 18. This illustration is of the Uncle GEM/AAIMTM Entity Relationship Diagram.

FIG. 19. This illustration is of the Uncle GEM/AAIMTM Required Software Functionality Diagram.

Figure 20:
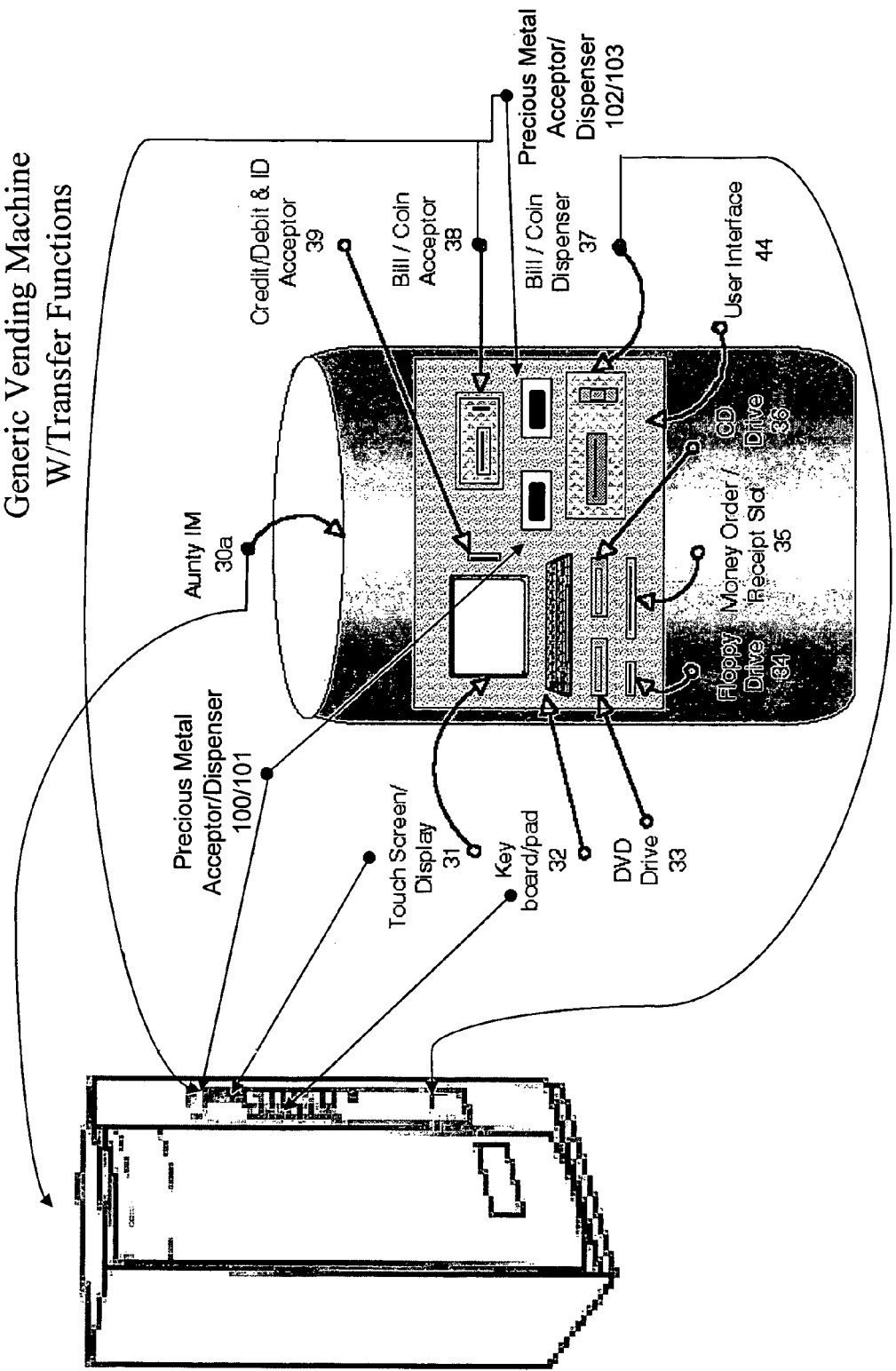

FIG. 20. This illustration is of the Uncle GEM/AAIMTM Generic Vending Machine with Transfer Functions.

Figure 21:
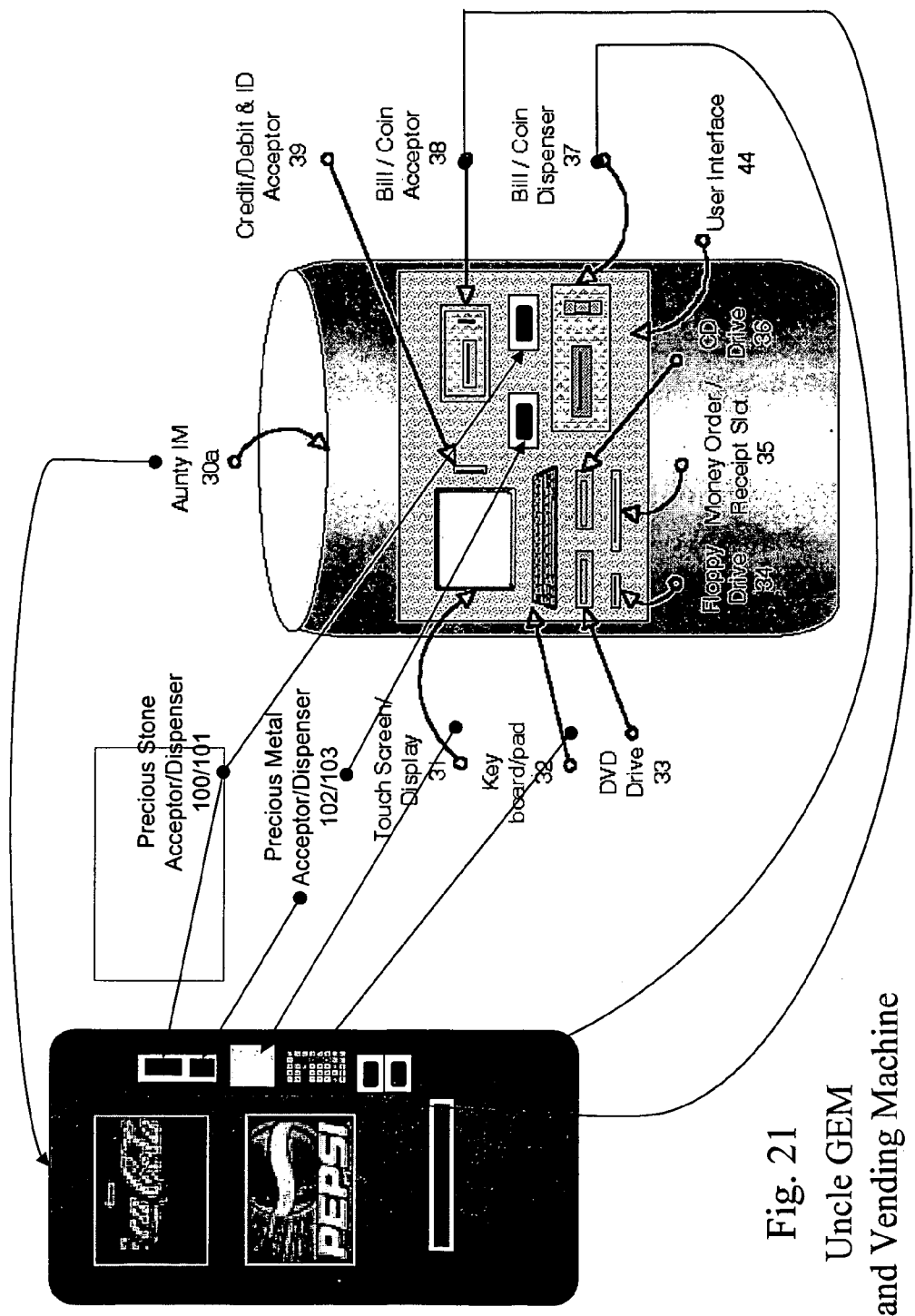

FIG. 21. This illustration is of the Uncle GEM/AAIMTM Generic/Brand Name Vending Machine with Transfer Functions.

DETAILED DESCRIPTION OF THE INVENTION

U.S. Pat. No. 5,963,647, U.S. Pat. No. 5,825,003, and U.S. Pat. No. 5,982,918 that are incorporated herein by reference can be greatly improved and enhanced by using the teachings of the instant invention, so as to provide a more versatile, universal and dynamic system(s) that can be used by all peoples of the world. These improvements are especially useful to the poor and middle class who regularly are being phased out of the banking system of now and the future (the unbanked) Eclipsing and revolutionizing the art, the system is able to interface and interact with ATMs and modify and improve ATMs, customer activated terminals (CATs), and similar banking/financial kiosks. The addition of video cameras and the like will enable appropriate government institutions, i.e., NSA and others, to monitor the system in real-time to encourage compliance with all government laws and regulations both nationally and globally.

The instant invention, as described and illustrated herein, is a money transfer process and advanced automatic teller machine and device (Uncle GEM/AAIMTM) consisting of a cash (paper currency) bill acceptor, accepting/dispensing devices, or optionally coin accepting/return devices and gold coins, silver coins, platinum coins, diamonds accepting/return/dispensing devices, debit card readers/acceptors and reloaders/burners, smart card acceptors and burners/reloading means and smart card and/or debit card dispensers. In addition any type of bank card or club organization store card and/or financial instrument can be dispensed and/or accepted and processed by the instant invention, etc., coupled to a display unit (which may include a touch screen or pen-write display and/or dynamic pen authentication signature means), Customer Service phone means, data input devices, and a expanded printer/dispenser that uses computer/microprocessor(s) and modem(s) and/or transceiver means (including voice over Internet protocol(s) VOIP), see Computer User (Atlanta) September 2003, incorporated herein by reference, for control and communication to multiple such devices [A1-n, B1-n] and/or a centralized database for transactions, accounting, and inventory control.

A multiplicity of the devices on a communications network, be it telephonic, wireless, etc., is available 24, hours a day, as sender, receiver and dispenser [A or B] of funds interchangeably. A Receiver (Uncle GEM/AAIMTM B) becomes a Dispenser when the Recipient (a person) retrieves the pending transaction that was originally sent by initiator or sender from device A (Uncle GEM/AAIMTM A), the Recipient uses a verifiable password, identification, and/or authentication means. Obviously, it is possible for the intended receiver to retrieve his money from the device, Uncle GEM/AAIMTM A, if by chance he is in the vicinity of Uncle GEM/AAIMTM A. All that is required is to merely input his verifiable password, identification, or authentication means including biometrics means. However, if the payment of the transaction fee is paid at the receiver/dispenser, then, when prompted by the receiver/dispenser, the additional information is inputted indicating to the device whether to deduct the fee from the transferred funds or the fee will be remitted by the Recipient.

The Uncle GEM/AAIMTM employs I/O devices, such as CD-ROM, CD-RW, DVD, high definition DVD, scanners, diskette drives, and/or any other associated technology and means known to those skilled in the art. A writable screen, digital pen, dynamic signature technology and/or other authentication means known to those skilled in the art can be employed to enable handwriting or to use a signature for documents and generally for any or all money transfers. This will enhance security and increase versatility. Biometrics capabilities and an expanded output and input means will enable and facilitate large amounts of cash/funds and data transfers. Various geometric shapes of the kiosk containing the machine may be employed to eliminate long lines, i.e., cubic, spherical, cylindrical, and pyramidal, as well the multitiered feature be it physical or holographic (multi-channel holographic touch screen and input/output I/O features, etc.) A cubic shaped kiosk allows for example four (4) or more users to simultaneously access the system, since each vertical face of the cube contains a machine. Also, the use of holographic technology can enable multi-channel techniques or multiple displays which can augment this function allowing for increased accessibility. Automatic or manual, level positioning of the face units or entire structure to adjust to the proper or desired height of the user for easy access and use is incorporated into the instant invention this will address the needs of the handicapped and disabled as well as children, short and tall people, etc.

The addition of Audio, Video and Voice-Recognition (AVRCG), sound/voice (S/V) technology, and/or video, data streaming, and/or live-feed technology will facilitate use of the machines and enhance man-machine interaction, enabling real-time money transfers. AVRCG and S/V prompts in different languages and diverse dialects will aid in the understanding and use of the system. A user can see and hear instructions and give commands to be led or spoon fed through the process. Maps and charts on the display along with GPS technology aid in the process.

Genetic technology including DNA technology, biochips and genetic programming can be employed. Melanin based chips and circuitry, neural networks as well as Brain Machine Interface (BMI) and other technologies including psionic or telepathic systems/processes ideally suited for paraplegics and others with or without impairments can be employed.

The technology of magnetic-spin processing and circuitry, or spintronics and nanotechnology, can be employed. Quantum information science, quantum processing, quantum-dots/programmable matter, and quantum teleportation methods, schemes, and systems can be utilized in this system. The process or phenomenon known as entanglement and the ability to create and use quantum states to create cryptographic keys that are virtually immune or impervious to eavesdropping or hackers is ideally suited for this system. In quantum processing and quantum teleportation, 1s and 0s, or bits, are represented instead by superimposed quantum states or Q-bits and E-bits. A type of quantum teleportation scheme or process can be demonstrated wherein information and data (or money/currency/coins) is quantum teleported. Quantum information science, quantum computing, quantum cryptographic keys and algorithms, and quantum teleportation methods and schemes will enhance the process and achieve the goal of efficient and secure money/data transfers, see Scientific American, vol. 13, no. 1, 2003, incorporated by reference herein.

Secured information or data may also be encrypted and transmitted. Appropriate security software can be used and Virtual Private Networks (VPNs) may be utilized. This information includes but is not limited to: insurance information and records; business data and records; billing information; medical information, data and records; credit information, data and record(s) and generally any confidential or personal information. Also, the device can interface with the Internet (on-line) to allow a user to pay for any type of goods and services with real currency and/or credit or debit cards and various financial instruments and alternatively with gold, silver and other precious metals/coins. This can be enhanced especially if quantum teleportation methods, schemes and processes are used. A user of the system can engage in Internet or online casino gambling, lotteries, and pay-as-you-go sites.

The system is also capable of supporting an on-line stock market that would be a type of cyber space securities and exchange, stock market, or virtual stock market, wherein securities and various financial instruments could be bought or sold including barter/trade/methods and systems and means. Essentially it can be a cyber or virtual wall street. Airline tickets, bill payment and check cashing can also be accomplished by this system. The instant invention is capable of robust operation anywhere or place land, air or sea underwater and including outer space and beyond (interplanetary). And throughout the universe especially when gold, platinum and silver and other precious metals and/or precious and semiprecious stones are used as a form of payment.

In most European countries as well as other countries in the Americas in Asia, Europe, Africa and others money or currency exchangers are used to convert one form of national currency into another some of these machines may already posses a currency ingress and many of use other financial instruments. A system modification and network modification of these currency conversion machines can enable them to not only convert their respective currencies, but also can be retrofitted with the instant invention technology and thereby enhanced so these machines can now send as well as receive currency, gold, silver, platinum, palladium coins and various combinations of precious and semiprecious coins and stones, instruments, and other, precious coinage (metallic and non-metallic) to a distal location (anywhere) and from a proximal location (anywhere). For example, if German Marks were to be converted to the EURO because someone in France uses only Euros, the machine could, using the instant invention's technology merely output (send) the amount to be transferred to the respective country. In this case, the system calculates Mark/Euro exchange rate (if any) and deducts any miscellaneous fees, which can be charged at either end. Basically this is what the Aunty IM and Uncle GEM do and to use it to augment and/or enhance currency conversion will be a major help to all of the peoples of the world, see U.S. Pat. No. 6,554,184 incorporated herein by reference.

An Improved Automated Teller Machine (ATM)

A conventional automated teller machine (ATM) can be greatly improved through software, system and network modifications/enhancements and hardware improvements/additions and dedicated so that it can perform as an Uncle GEM/Aunty IM. Therefore its primary functions are updated to handle the purchase of goods and services and to handle data transfers globally, anywhere, anytime, and with any one, thing, business, institution or entity, via the Internet or other communications medium, using money and precious stones, gold coins, silver coins, etc., as long as the transaction is legal and follows all government laws and regulations.

A single bill acceptor (or multiple bill acceptors) can be installed and integrated into the modified enhanced ATM. Also, the bill acceptor can be enhanced to accept coupons, manufacturers discounts and other financial products/instruments. The machines can operate and provide great service to humans by just having a bill/currency ingress/acceptor; however, the addition or elimination of a coin acceptor/dispenser is optional. Having a coin acceptor/dispenser is optional, since money transfers can be rounded off to the nearest dollar, mark, yen, etc. This is understood and obvious in U.S. Pat. No. 6,554,184. However, human nature the global economy and nations currencies are constantly in flux. The addition and use of gold coins, silver coins, platinum coins, and others and/or alternatively barter methods/systems and means can provide a simple quick remedy in times of currency distress/insolvency and general hyper-inflation. Also, the use of gold and silver, etc., creates a unique specialty market and allows a means for those in possession of the same to participate in buying and selling globally and is an alternative means of commerce.

The instant invention also is designed to allow accessibility by the handicapped or disabled, the multitiered ATM, Uncle GEM/AAIMTM systems addresses this problem and the ATM can be redesigned so that any of the input/output (I/O) means as well as the entire machine can have a type of elevator or level selection means (or be static, i.e., shelves) which allows the pertinent functions to move into the proper position to enable anyone of any height or disability to easily gain access to the features of the system and benefit, especially the disabled, children, and short/tall people, etc. A simple button or means would activate this feature. Also, the machine itself could scan the user upon approach or other activation means and automatically adjust itself to a desired level position or height, thereby enabling easier access by the user and this will comply with government law/regulations for true access by the disabled/handicapped. The detection means could be biometrics and other means known to those skilled in the art, cameras/scanners/signals/systems, etc. This feature allows the ATM to reposition or adjust itself to the proper level/height of the user automatically upon detection of the approaching user regardless of their height, ability, or limitations and additional biometrics features could enable virtually anyone regardless of physical ability to safely use the instant invention, see Feedback and Control Systems with applications to the Engineering, Physical And Life Sciences, DI Stesfano III, Stubberud, Williams, 1967, incorporated herein by reference.

In the probable event of global unrest and currency insolvency, the instant invention offers a possible expedient or solution to faltering currencies, including paper and nonprecious metal coins/mints, etc. Through enhancement and modification and general improvement of the proverbial ATM system, including hardware/software/network(s), etc., and to enhance/modify the coin acceptor apparatus to now accept precious metal coins/coinage including gold, silver, platinum, palladium, and other precious metals type coins and combinations thereof this could include old ancient type coins and newly minted coins, see 2004 Standard Catalog of World Coins by Chester L. Krause and Clifford Mishler, 1901-present, 31st edition, incorporated herein by reference. The addition or ability to transfer sums using precious metal coins will serve to enable the continuation of modern commerce in the event of a global financial collapse. This may occur due to the 100s of trillions in deficit that is being masked or hidden from unsuspecting citizens. Also, due to the fact that in times of super or hyper inflation gold/platinum/silver and other precious metals maintain and generally increase in value, and are a natural hedge against inflation. Therefore, precious metals and coins could be transferred as well as paper/currency transfers, globally, since by their very nature international conversions should be easier in many cases and of course all of the aforementioned can be done concurrently, interchangeably or and simultaneously if one prefers by merely selecting the appropriate features on the instant invention and machine.

The transference of precious stones is also anticipated i.e., diamonds, emeralds, sapphires, topaz, etc., and combinations of the aforementioned, jewelry, including gold platinum and other precious metals including barter and means and systems. In essence a optional barter type system is anticipated enabling sums or trades to be accomplished transferred. or exchanged and goods and services to be purchased with the instant invention and through the Internet, World Wide Web/online, and other communication means, as well as modified I/O means known to those skilled in the art/science. Therefore a modified automated teller machine including system/network modifications and enhanced gold or precious metals coin acceptor could in principle by itself perform global money transfers and Internet commerce and enable the purchasing of goods and services on the Internet and other global communication means including using precious metals and/or coins as the means of payment. Various established methods of assay be it electronic, chemical physical optical or means known to those skilled in the art of gold, silver bullion and other precious metals and combinations thereof can be employed. These methods and means can be streamlined and made compact and incorporated into the system/machines. In addition a gold, silver, platinum or precious metals modified coin acceptor ingress. can be used as the input means and a corresponding modified egress or dispensing output means can be employed. Therefore at either end, currency, gold coins, silver, platinum coins, etc., can be inserted and sent/transferred anywhere on the globe and at the other (distal end) end, the receiver could receive either gold/silver/platinum coins or optionally accept standard copper/nickel, etc., coins or accepted combinations of the aforementioned or paper currency.

The modified Automated teller machine could also employ a currency ingress bill acceptor and via system/software modifications one could insert currency and therefore the (after foreign currency conversion) calculated equivalent and/or assay, gold, silver, platinum, etc., coinage can be output or received if desired at the other end by the receiver and vice versa. Precious stones/coinage can be done in a similar manner (or alternately via a barter system) and optionally the latter is easier If the precious metals or instruments is fashioned or made into a standard or as a coin. The instant invention enables a user to (go on-line) surf or search the Internet or similar medium (any method/means of Global communication) that can be accessed using the modified/enhanced advanced ATM (Uncle GEM/Aunty IM) and find what they want and pay for it in real time by merely inserting the required cash money into the cash ingress (bill acceptor) as well as coins and precious metals, gold, silver coins if desired into a modified, enhanced coin acceptor or optionally using other payment means, i.e., smart cards/debit/credit cards, coupons or other financial instruments and communication means including telephones and cell phones or combination of the aforementioned technology and means.

The Uncle GEM through internal/external security means will conform and comply with all government restrictions and laws across all national and international borders. However, it will allow a human being to maintain a modicum of freedom/privacy in their lives and a bit of control over their destiny as well as enabling everyone regardless of financial level to participate in the global Internet phenomenon and possibly serve to prevent global currency insolvency since in principle a gold or similar precious metals backing could in theory and practice support and authenticate virtually any paper type currency from any nation or entity globally. One solution, alternative is to have a cash ingress integrated into an automated teller machine (ATM) system and with the insertion of currency or optionally gold coins, etc., a user merely purchases a financial instrument which could be a credit card or temporary debit, Visa or Mastercard smart card etc., similar to going to Kinko's and using their kiosks which after inserting money one receives a card which can be used to copy or do work on their computers. The latter has many variants and the means is known to those skilled in the art. The Aunty IM/Uncle GEM can incorporate an enhanced, improved version of this or alternative method and correspondingly dispense and load or reload/replenish any type of financial instruments including smart cards, debit cards, coupons, Visa or Mastercards, telephone cards, American Express and virtually any type of financial card or financial instrument, many of these cards can be prepaid if the buyer is generally uncreditworthy or just for convenience. Thereafter the buyer of these instruments are free to participate and purchase goods and services on the Internet, on-line. or use other global or regional communication means. However, the ability of a user to use currency, simple cash/precious metals coins gold/silver, etc., to actually pay for goods and services on-line i.e. the Internet in real time by using a modified automated teller machine (ATM) systems/networks which can interact on a global level anywhere (superhighway) is a more simple, private, practical, safe and trustworthy solution. This will enable anyone regardless of age or monetary status to have the ability to shop at their fingertips and truly participate on a global level in the new global economy. The instant invention can be further enhanced with the addition of breakthroughs in sound/acoustics and optics including Holographic optics. The addition of these technologies serve as improved security measures, Hypersonic sound (HSS) technology/speakers can be employed so that only the sender and receiver can hear command prompts and real-time conversations with the modified ATM and intended receiver, therefore headphones would be optional. In addition Holographic optics including diffractive optics, holographic optical elements (HOEs & MOEs) and holographic diffusers which can precisely direct computer images, to a desired or restricted space or viewing angle can be incorporated especially using various multi-channel holographic projections and holographic touch interactive technologies. The latter would insure increased privacy since others standing nearby or interlopers would be unable to easily see the information on the computer screen if the hologram is designed to have a restricted field of view. The latter is possible further through precise design of a holographic diffuser or HOE. Therefore the emergent technology of virtual keyboards and interactive holographic touch screen and keyboards/keypads (Holographic Input/Output I/O devices/systems) can be integrated into the instant invention.

IBM company through it's dealers has marketed for years a system known as the PC register this good system enables merchants and others to have enhanced control of their cash receiving (cash registers) and payment inventory and accounting systems. In addition they are able to use the Internet with this system to assist in on-line purchases. There are others in the industry who have similar upgraded or super cash registers. The instant invention Uncle GEM/Aunty IM can help their efforts. Basically through system and network modification this PC register can be improved so that it's systems will allow currency to be accepted as well as send or transferred (money transfer) and also modified to access the Internet and pay for on-line purchases in cash or gold coins silver coins and other precious metals and to authenticate or backup and support faltering currencies.

Paying for Internet Goods and Services

An automated teller machine (ATM) can be modified/enhanced and converted into an Uncle GEM/Aunty IM so that any person can access the Internet from this modified ATM which could be DSL or wireless also, cable, etc., or by other communication means known to those skilled in the art. The user can then surf the net (go shopping) and upon finding what they want, select it and using the cash or currency ingress insert the correct amount including appropriate taxes and if foreign, proper exchange rates. The coin acceptor is an option not all of the systems (Uncle GEM/Aunty IMs) are required to have this function; however, the latter, the inventor believes is very important in that it allows the possibility for increased commerce and convenience, especially when one considers the need for global commerce. It is entirely within reason and possible for a tiny merchant in a village in China, Himalayas, India or Bangladesh to offer for sale an item say a trinket or basket or some item that costs a few dollars or say a few cents. The Uncle IM/Uncle GEM/Aunty IM or modified ATM can easily handle bills or coins, The state of technology is advanced enough so that any sum no matter how small or large can be accommodated. In addition it is understood that the modified ATMs or Uncle GEMS/Aunty IMs can accept deposits in denominations of $1 to $100. However, the system can accept virtually any amount and excess denomination in many instances the denominations vary and may be larger than a $100 bill, i.e., $1,000 bills $5,000 bills, $10,000, and above including fractional amounts of the penny or dollar, etc., or the equivalent amounts (virtually unlimited amounts can be sent or received). Also for excessive amounts a deposit feature on the machines can be used the latter method is quite known to those skilled in the art, in fact their are digital devices that are sensitive enough and capable of measuring and counting/weighing the currency and rendering the proper tally, as well as normal bill counting and sorting technology/devices all of the aforementioned can be incorporated into the modified ATMs or Uncle GEM/Aunty IMs. True 3D digital computer technology as well as holographic technology including holographic interactive touch technology can be employed to assist and help customers to inspect and choose their merchandise goods and services.

Music, Music Videos, Movies, and Books (Goods & Services)

The Uncle GEMS/Aunty IMs or modified automatic teller machines (ATMs) can allow anyone anywhere to access the Internet/online feature of the machines and to select any music (or movie) any where anytime and of any artist and with the blessing of the RIAA and MPAA pay for it in cash or currency check (physical paper or electronic check writing and verification means) Debit cards, smart card, credit cards or Visa and Mastercards and generally with any financial instrument including coupons. In addition some bill acceptors are capable of accepting coupons. The user can find a song or artists works and upon selecting it pay for it using the cash/currency ingress and/or aforementioned instantly in real time. The user can also surf the net for movies made anywhere on the planet and select them and pay for them using the cash/currency ingress. and/or gold coins, etc., XM satellite, Cirrus and others, Amazon.com, Kazaa users, BuyMusic.com, Rhapsody (listen.com), Pressplay (pressplay.com), MusicNet (musicnet.com), Microsoft, AOL, Yahoo, Walmart and a host of Internet service providers and others can be helped by the use of the instant invention. In addition auctioning sites such as Ebay and others can be engaged and with the World Wide Web online, Internet at ones fingertips (feature of the modified ATMs, Uncle GEMS, Aunty IMs) actually win bids and pay for and transaction, goods and services on the spot as well as engage in gambling, etc., in real-time using the cash/currency ingress as well as the precious metals acceptor ingress. True 3D digital computer images and holographic technology as well as voice and sound can be displayed and heard to assist the customer/buyer in their purchase. In addition the vast untapped audience of unsigned artists (and signed artists) both for music and for independent movie makers and nonindependent movie makers have a practical means for getting paid for their products and not have to rely upon political or monetary roadblocks.

Multitiered Uncle GEM/Aunty IM Automatic Level Position/Access (for the Physically Challenged)

The Advanced Automatic Instant Money Transfer Machine illustrates several multisided or multiple face units which allow more than one person to access the system, i.e., four sided cube and cylindrical, etc. The multitiered Uncle GEM/Aunty IM is a significant improvement in that a system/apparatus and machine is needed that can address the problems of tall people, short people and handicapped or the disabled. The addition of multiple bill acceptors from top to bottom and the addition of multiple screens and keyboards as well as multiple dispensers and multiple coin acceptors that are arrayed from top to bottom can enable the physically challenged to participate and benefit from this inventive systems as well as assisting average height individuals. One could obviously design a system wherein the bill acceptors/coin acceptors and dispensers and screens/keyboards/keypads and other accessories that can actually move into various positions up and down or sidewise even diagonal, and rotate and assume virtually any desired position for easier access by the user. However, the addition of multiple bill acceptors, would help tremendously and multiple output dispensers (multiple I/O) screens would also be a be a good solution, multiple coin acceptors and dispensers can also be used in conjunction with the bill apparatus acceptors or as stand alone by themselves. The latter would be an improvement and in contrast to the now ubiquitous COINSTAR machine, see Pat. No. 5,564,548, incorporated herein by reference. This system accepts coins and outputs the amount in the form of a receipt, to be redeemed by the cashier. Using the teachings of the instant invention the COINSTAR apparatus can be modified and enhanced to not only output the aggregate or total amount of coins input into the device, but it can also be engineered/designed to send this amount to some body (money transfers) and/or to perform on-line purchases on the World Wide Web enabling a user to easily purchase anything, and also to dispense the amounts tallied into cash or paper currency's or alternately gold or silver and also to be mutitiered. In addition it is possible to further engineer/design the machine to convert the input coins into different denominations/foreign, etc., and as stated to also accept gold and silver coins and to dispense gold or silver coins or paper currencies in any denomination and of any type from any nation and to any nation on the globe and to perform currency conversions and money transfers and to accept virtually any type of coin of value from nations throughout the world. The machine employs several or multiple bill acceptors and optional multiple coin acceptors from the top to the bottom of the structure. This would accommodate tall and short people as well as people with handicaps (wheelchairs, etc.) and children. The vertical expansion (or horizontal rectangular expansion) of the instant invention can enable and assist humans of various heights and abilities and disabilities.

Also multiple functions can be integrated in this device and virtually any type of goods or service can be offered by this inventive system, For example if situated in a gas or service station environment the means to instantly pay for gas or any merchandise goods or service can be accomplished. In addition if one wanted to play the lottery/gamble or buy tickets pay bills, or purchase soft drinks, Coke or Pepsi/cigarettes/beer alcohol, etc., one could conceivably do this with one of the multiple bill acceptors and optional coin acceptors and/or precious metals gold, silver coins acceptors and still have the means at their disposal to make money transfers and online transfers purchases and goods and services as well as normal Automatic Teller Machine (ATM) functions. In addition the current rise and acceptance of automated cashiers such as U-scan (self service checkout machines, i.e., supermarkets and other retail outlets) enable greater versatility for humans and enable great savings of time and independence for customers. The Uncle GEMs/Aunty IMs can be integrated and incorporated into these devices to enhance its capabilities. Since the user is already accustomed to paying with cash and coins (or credit/debit) cards and various financial instruments including coupons, the machine can be modified to use the existing system components and/or interface with the Uncle GEM/Aunty IM system allowing one to make money transfers and access and use online services and still possess some U-scan capabilities as well. Additional cash input/ingress can be made on this hybrid device and software interface/integration will enable anyone to purchase goods and services by using the integrated Uncle GEM/Aunty IM and accomplish money transfers and online purchases as well. Virtually any vending machine that accepts currency/coins or credit cards/financial instruments can be modified and integrated with the Uncle GEM/Aunty IM system and can in turn be upgraded improved and enhanced with this inventive system. Also, the multitiered device can also contain multiple screens and those which digitally allow multiple windows in addition multichannel interactive holographic touch screen displays or I/O holographic display systems can be integrated into the instant invention, so that a human user can have greater choice, control and convenience/access.

Assay Methods for Precious Metals and Stones

The Uncle GEM particularly includes methods for authenticating gold, platinum and other precious metals and stones (including semi-precious items). These methods can rely on electrical and thermal conductivity. Some diamond assay methods rely upon analysis of the absorption spectra of the elements in the diamond including fluorescence and/or infrared spectrometers. Additional methods are known to those skilled in the art, some employing Nuclear Magnetic Resonance Imaging (NMRI) or Magnetic Resonance Imaging (MRI) and X-Ray Tomagraphy. These methods could be made available as required, see Synthetic Diamonds May Overtake Real Ones, Today's Science On File, Technology, October 2003, The Diamond Wars have Begun by Joshua Davis, Wired, September 2003, page 96, and Carbon Copy by Mark Fischetti, Scientific American, February 2003, page 82, all incorporated herein by reference. A suitable compact precious metals gold, platinum silver coin acceptor and/or diamond and other precious stone acceptors (and dispensers) can be fabricated, manufactured or purchased and used in the instant invention.

In addition many vending machines such as Coke"/Coca Cola", Frito Lay", Pepsi", etc., machines and other cash machines such as those at convenience stores can be improved through system modification/network modifications and allow the insertion of actual cash and coins or precious metals coins/coinage to and transferred from a proximal to a distal location or recipient.

Optional features include but are not limited to:

Post/future dated retrieval of money/data transfers;

Maximum wait time (MWT) to retrieve transferred funds/data, when the MWT elapses the funds/data are returned to the Initiator or a Designee;

Global accessibility to transferred funds and partial payment of the transfer fee is optional.

Compatibility to any network or networking architecture and/or protocols for communications between devices A and B, the CDBS or other financial institutions network will be utilized, including Voice over Internet protocols (VOIP), Television phones (TV Phone) technology and means, Electromagnetic ID means, including Radio Frequency Identification means, tags etc.;

Functions and apparatus for transactions and printing/ cashing money orders, personal or payroll checks, including government payroll checks, physical or electronic means, and electronic check creation and printing means, bill payment means and systems. with either currency or electronic and other means, United States Postal Stamp Dispenser and optionally any country or global stamp dispenser and U.S. money orders or universal or global money orders from any financial entity/ organization, bank etc, Also, mail Drop receptacles (deposit means) for U.S. and international mail and/or any country world wide including acceptance and payment methods and apparatus for FedEx, UPS and virtually any type of courier. Authentication of ones signature and pen-write and or dynamic pen signature technology thumb print identification/authentication technologies and means and apparatus technology to enhance and assure/insure, safeguard and verify financial transactions. All and virtually any financial instruments can be accepted and most can be created electronically /optically and dispensed by the instant invention, including telephone cards, smart cards and debit cards and means for dispensing and reloading/replenishing or increasing, decreasing, readjusting its monetary equivalent or value.

Purchasing money market(s), stocks/bonds, tickets (transportation, entertainment), music and music videos, rent movies and music videos, etc, bills, etc., via select means;

Check cashing services with passwords, codes, encryption, authentication means and writable screen/pen/write digital pen technology and means and dynamic pen signature technology used for further authentication.

Dunce's guide to money transfers (a tutorial on how to utilize the Uncle GEM/Aunty IM system);

Airline purchases and payment for Amtrak, Greyhound including the installation of The Uncle Gem/Aunty IM units on earth, airplanes, jets, subways, rocket ships, cruise ships, trains, buses, the moon, Mars or extraterrestrial locations, etc.

Handicapped patron options (including voice recognition, Braille, TDD, etc.), automatic level position means via sensor/mechanism features.

Gold, silver, platinum coins and precious metals, diamonds, bullion and means and apparatus for acceptance, process capability, and input means and dispensing means to allow or permit alternative methods of money transfers, on-line payments including gambling and universal global commerce, including commerce with potential aliens from outer space or inner space (inter dimensional), other precious metals and elements heretofore unknown including cold pressed latinum.

Detailed Description of the Drawings FIG. 1 is an illustration of an Uncle GEM/AAIMTM Internal Network and System (INS) [10] logical data flow showing a series of Uncle GEMs/AAIMTMs on a network. The series of Uncle GEMS/AAIMTMs are capable of transfers from a proximal location(s) [1], Uncle GEMs/AAIMTMs or devices A1-An, to distal location(s) [5], Uncle GEMs/AAIMTMs or devices B1-Bn, via the Uncle GEM/AAIMTM internal network [6] (in blue). Each Uncle GEM/AAIMTM has the capability to be in direct communication with every other Uncle GEM/AAIMTM in the series A and B. As discussed above, any Uncle GEM/AAIMTM is interchangeably at a proximal and/or distal location depending on whether an initiator [54] or a Recipient [52] (not shown on this diagram, see FIG. 10) starts a process. FIG. 1 is intended to give a logical representation of where data is sent in the Uncle GEM/AAIMTM INS [10]. Each Uncle GEM/AAIMTM is capable of sending and receiving signals and data with or without a centralized network controller and is capable of tracking transactions, inventory and other operations data as necessary. This method of communication is well known to those skilled in the art as a "neural network" or mesh.

Another embodiment in FIG. 1 is that signals from the series of Uncle GEMS/AAIMTMs [1] are routed to a processor [2] or alternately directly to a central database server (CDBS) [3] to do required day to day functions including end-of-day processing and/or track transactions on the internal network [6]. Both proximal Uncle GEMS/AAIMTMs [1] or distal Uncle GEMS/AAIMTMs [5], as needed, route traffic to processor [2] using transmission paths [8]. (Transmission paths [8] are not shown in this diagram connecting Uncle GEMs/AAIMTMs [5] to CDBS [3]; however, it is understood that this can occur.) The processor [2] proceeds to transmit and receive data via signal path [4] to and from the CDBS [3] shown all together as Uncle GEM/AAIMTM HQ [9]. The processor [2] may function as a front end, a demilitarized zone (DMZ), or as a host for the CDBS [3]. The trusted transmission paths [7] allow each proximal Uncle GEM/AAIMTM [1] or distal Uncle GEM/AAIMTM [5] to directly connect to the CDBS [3] as the situation merits. (Transmission paths [7] are not shown in this diagram connecting Uncle GEMs/AAIMTMs [1] to CDBS [3]; however, it is understood that this can occur.) The transaction accounting and tracking of funds is handled by the CDBS [3], which also allows for data mining of current and past trends in usage, inventory, and/or other database functions well known to one skilled in the art.

FIG. 2 is an illustration of the Uncle GEM/MIMTM/External Network Logical Data Flowchart detailing an Uncle GEM/AAIMTM INS [10] accessing and communicating with a financial institution's network (FIN) [11]. For convenience the Uncle GEM/AAIMTM INS [10] of FIG. 1 is shown compressed as element [10a], wherein devices A1-An [1] are represented Uncle GEM/AAIMTM A [1a], devices B1-Bn [5] are represented as Uncle GEM/AAIMTM B [5a], the internal network [6] is shown as a logical network path [6a], transmission paths [8] are now a logical transmission path [8a], and trusted transmission paths [7] are now a logical trusted path [7a].

FIG. 2 shows external transmission paths [17], which allow Uncle GEM/AAIMTM HQ [9] access to a FIN [11] through the FIN's remote front-end processor [12] and/or it's ATM network [14]. Logical networks [15] and [16], shown only as a convenience to this discussion, are part of the FIN [11]. This arrangement in turn permits the plethora of parent banks' mainframes and ATM networks a single contact point processor [2] in the Uncle GEM/AAIMTM INS [10] through their associated logical networks [15 & 16]. Any Uncle GEM/

AAIMTM is capable of interfacing and communicating with virtually any bank or FIN worldwide.

FIG. 3 embodies an alternate PC/Uncle GEM/AAIMTM INS/External Network Logical Data Flowchart detailing an Uncle GEM/AAIMTM INS [10a] that is accessed by a PC [19] (or similar Internet connection device). The external transmission paths [17] and logical transmission paths [21] and [22] are only representational of either satellite, wireless, wired (telephonic), Internet and/or any other communications means [20] known to those skilled in the art including cable modems and/or DSL modems, wireless modems, WiFi, etc., The PC accesses the Uncle GEM/AAIMTM web page (not shown) via logical transmission path [21] to connect to an Internet Service Provider (ISP) [18] or directly to Uncle GEM/AAIMTM INS [10a] via an external transmission path [17]. The ISP [18] uses its own logical transmission path [22] to connect through to the Uncle GEM/AAIMTM INS [10], usually through the Internet or any communications means.

The Uncle GEM/AAIMTM HQ [9] acts as an intermediary that interfaces and communicates with a distal FIN [11] to send account information (credit or debit) and receive acknowledgment of the availability of funds to be transferred. Then the Uncle GEM/AAIMTM HQ [9] transmits the proper transaction information to both the PC and the appropriate individual Uncle GEMS/AAIMTMs as receivers and potential dispensers of funds. The Uncle GEM/AAIMTM INS [10a] transmits a confirmation/receipt of the transaction on screen, via e-mail or snail mail of which a PC user [23] receives.

FIG. 4 illustrates the Advanced AIMTM Embodiment A is an illustration of a basic Advanced Automatic Instant Money Transfer Machine. In this drawing only one face is depicted; however, multiple interfaces can be added to this system or machine so that several people can simultaneously access the Uncle GEM/AAIMTM. The Uncle GEM/AAIMTM or Uncle GEM/Aunty IM [30a] comprises (besides the housing): a touch screen, writable screen, pen-write display, optional holographic and/or digital pen means [31], (and/or dynamic pen signature means and authentication means) and/or keypad/keyboard [32], a slot [35] for money orders, receipt and/or other financial instruments, a (single or multiple) bill/coin dispenser [37], a (single or multiple) bill/coin acceptor [38], and a (single or multiple) credit/debit & id acceptor/dispenser [39]. What is also included in the Uncle GEM/Aunty IM [30a-d] are DVD drives [33], a floppy drive and a CD drive [36] (read or read/write) as part of the user interface. Also in the Uncle GEM/Aunty IM [30], which is not shown but is included and not limited to, are bill collators and stackers, a receptacle for temporarily holding bills and coins, a safe for fee deposits, and reservoirs for bill and coin dispensing, plus those elements discussed in application Ser. No. 09/565,389. Also, the Uncle GEM/Aunty IM [20] a modified coin acceptor/dispenser designed to acceptor dispense gold coins or silver coins and other precious metals and coins new or ancient [100/101], diamond and other precious/semiprecious stone acceptor, receptacle and or dispenser [102/103], smartcard reader/dispenser [104/105], and customer service phone [106].

FIGS. 4b-9 illustrate Advanced AIMTM Embodiments B-E all of which includes all elements in Uncle GEM/AAIMTM [30a] (in FIG. 4) except FIG. 4b does not show the optional coin acceptor but otherwise including modified (optional) gold coin acceptor, silver coin acceptor and other precious metals/coins acceptor [100] and precious metal coin output dispenser(s) [101]. FIG. 5 shows Embodiment B that includes a speaker [40] and microphone [41] for audio interfacing and interaction and optional gold/silver coin acceptor [100] and gold/silver coin dispenser [101] as described above under "Detailed Description of Invention". FIG. 6 displays Embodiment C that includes a camera lens and/or video interface means [43]. and optional gold/silver coin acceptor [100]. and dispenser [101]. FIG. 7 shows Embodiment D that has biometrics scanner/means and optionally gold/silver coin acceptor [100] and dispenser [101]. FIGS. 8 and 9 depict Embodiment E that includes multiple interfaces [44] and [45] enabling multiple users [46] access to Uncle GEM/Aunty IM [30e] money transfer functions wherein also optional gold/silver and precious metals ingress acceptors and output egress dispensers [101],[100] are illustrated. In FIG. 9 Uncle GEM/Aunty IM [30e] is cylindrical in shape optional/silver coin acceptor [100] and dispenser [101].

This next discussion delineates the transfer procedure that is common to all Embodiments A-E in FIGS. 1-19, the set of processes is designated all together as transfer transactions. As discussed in application Ser. No. 09/565,389, it is as follows:

The Sender [50], device A [1], indicates a transfer is desired creating (via system) a pending transaction generated from the transfer information. The transfer information consists of who pays for the transfer (Initiator [54] or Recipient [52]), identification data about the Recipient (to whom), and identification data about the location(s) (to where) the funds are to be made available to device B (or devices B1-n [5] at multiple sites). The money to be sent and optionally the applicable fee is inserted into the bill/coin acceptors [38] at device A (optionally gold/silver coins) and is verified against the keypad/keyboard [32], or touch screen [31] input amount. A password or authentication means is then either inputted by the Initiator [54] or generated by sender [50] (or via system) to give to the Recipient [52] by phone or other means and added to the pending transaction. The transaction information is verified by the Sender [50], device A, with the Initiator [54]. A first set of signals (or optional signal or multiple sets of signals) consisting of the pending transaction information is transmitted via modem/transceiver [56] (or cable modem) through communications network [20] (or combination of transmission paths [6-8]). An optional receipt is then generated by the printer through the dispenser or (receipt slot) [35] for the Initiator [54]. Alternatively a cookie, e-mail or by means known to those skilled in the art is given to the Initiator's or Agent's PC [19] to verify the transaction via the CDBS [3] or Internet web page, see FIGS. 12-13.

The Recipient [52], notified as mentions above, at a Receiver [51], device B1, proceeds to retrieve the funds through device B1 indicating a retrieval is desired using the password or authentication means, The information is verified by device B1 (Receiver [51]) which now becomes a Dispenser [51]. However, if the payment of the transaction fee is paid at Dispenser [51], then, when prompted, the additional information is inputted at keypad/keyboard [32] or touch screen indicating to the Dispenser [51] whether to deduct the fee from the transferred funds or the fee will be remitted (fed into the bill/coin acceptor [38]) or (optional gold or silver and precious metals coin acceptor [100]) by the Recipient. An optonal second set of signals or single or multiple signals [see Practical Cisco Routers by Joe Habraken 1999, Que Corporation incorporated herein by reference, see Cisco Certified Network associate 4th edition 2004 Sybex Inc incorporated herein by reference, see Interconnecting Cisco Network Devices by Steve McQuerry 2000, Cisco Systems Inc incorporated by reference herein, see Cisco Internetworking by Charles Riley technical edition 2003, Syngress incorporated by reference herein, see Oracle E-Business -B Suite Financial Handbook by David James, Simon Russell Graham Seibert 2002 Qracle Press, Mcgraw Hill incorporated herein by reference] consisting of retrieval transaction information is transmitted back to the CDBS [3] and/or device A (Sender [50]) or financial institution [11]. The CDBS [3], financial institution [11], device A (Sender [50]), or device B1 (Dispenser [51]) cancels the pending transfer transaction indicating the funds are no longer available to other sites, devices B2-n [5], when the second set of signals is received, or single or multiple set of signals are received. Then the currency is dispensed minus any applicable fee. The nominal fee that may include appropriate taxes is charged at either or both ends of the transaction.

FIG. 10 shows Workflow Chart A is an illustration of Uncle GEM/AAIMTM system basic transfer transaction processes, which also are the process of FIGS. 11-13. The Initiator [54] starts the process on the first interface [44] which then causes the Uncle GEM/Aunty IM [30a] to become the sender [50]. The Initiator [54] then follows the procedure to create a transfer transaction. When the funds to be transferred (as cash, credit or debit) are verified, the transfer transaction is transmitted by the appropriate signals via the first modem/transceiver [56] using an Internet, satellite, telephonic, wireless or other communications means [20]. including cable modem, wireless modem, DSL, etc. The second modem/transceiver [56] then transmits the transfer transaction to the receiver/dispenser [51]. Through the second interface [44], the Recipient [52] starts a receiving transaction process on receiver/dispenser [51].

What is also new in this transaction process shown in FIGS. 10-13 is user access to the additional devices the AVRCG and S/V prompts and direct video allowing for possible real-time transactions and interaction from both proximal and distal ends: DVD drive [33], floppy drive [34], and CD drive [36] and more (see FIG. 4) also what is new is the gold coin or silver coin acceptor and precious metals coin acceptor [100] and gold/silver coin and precious metal coin dispenser [101]. The Initiator [54] and Recipient [52], collectively now referred to as the user/customer [46], can upload and download data to be handled and transferred much in the same manner as money transfer transactions. Whereas instead of indicating an initiated transaction as a money transfer, the customer [46] indicates a data transfer from a DVD, Floppy or CD drive or other means. The fee for this type of transfer optionally can be a surcharge based on the amount of data sent if so desired.

All data transfers will be secure in the transfer of packets across the Uncle GEM/AAIMTM INS [10] and any external network, since security is basic to all money transfers and ATM transactions and is well known to one of average skill in the art. However, additional safeguards are needed. With the addition of potential hacker activity and denial of service attacks on the new input devices [33], [34], and [36] data handling will be carried out in a manner similar to private intranets receiving data from the Internet. Use of a mini security zone, called a demilitarized zone (DMZ) known to those of average skill in the art, with packet sniffers, intrusion detection devices or agents, and anti-virus programming, would ensure protection of or significantly reduce the advent of adverse/hostile activity to the Uncle GEM/AAIMTM [30], the Uncle GEM/AAIMTM INS [10], and third party recipients of the secured money/data transfer, including quantum crytographic keys and associated technology.

FIG. 11 illustrates Workflow Chart B is an illustration of an Uncle GEM/AAIMTM system interacting with its Central Database Server (CDBS) [3], as in the description for FIG. 1. FIG. 12 shows Workflow Chart C that illustrates an Uncle GEM/AAIMTM system interacting with an external financial network through the processor, whereas the sender is utilizing a financial institution or terminal and/or PC, as in the description for FIG. 2, to send money from their proximal location to a distal location. FIG. 13 embodies Workflow Chart D, illustrating the Uncle GEM/AAIMTM system interacting with a standalone Internet kiosk, as in the description for FIG. 3.

FIG. 14 is an illustration of the Universal Automatic Instant Money, Data and Gold Transfer Machine Logical Transmission Signal Flow Graph. FIG. 15 is an illustration of a Universal Instant Money, Data and Gold Transfer Machine Logical Signal Control System Flowchart.

FIG. 16 is an illustration of an Uncle GEM and MIMTM with multitiered interfaces/levels and multiple sides also multiple gold coin or silver coin, platinum coins and optional precious metal coin ingress/acceptor means [100] and gold/silver/platinum coin dispenser means [101] is shown. Also, is featured automatic controller mechanisms with sensors that automatically adjust the relevant input/output features of the machines to the desired level or position of the user so that anyone including those with physical disabilities or handicapped can more easily gain access to the instant invention and use it.

FIG. 17 is a Aunty IM (Uncle GEM(tm)) diagram of Processes and Entities. FIG. 18 is an Entity Relationship Diagram wherein the triangle labeled A denotes subfunctions that include purchasing and rental/lease options, mentioned hereinabove for goods and services, including precious metals and stones accepted into the Uncle GEM as remittance. FIG. 19 is an illustration of required software functionality. FIG. 20 is the Aunty IM/Uncle GEM device wherein any Generic Vending Machine has been modified, retroffited and/or manufactured with transfer/purchase functionality using accepted funds and/or assayed values. FIG. 21 is the Aunty IM/Uncle GEM device wherein a Brand Name Vending Machine, such as Coke"/Coca Cola", Nestle", Frito Lay", Pepsi", etc., will be featured and has been modified, retrofitted and/or manufactured with transfer/purchase functionality using accepted funds and/or assayed values.

Various preferred embodiments of the invention have been described herein. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:
1. A device, comprising:
 a user interface configured to receive information from a user;
 a network interface;
 a dispenser mechanism configured to dispense a precious stone in response to the information received from the user by the user interface;
 wherein the device is configured to send, to a financial institution via the network interface, information that indicates a value associated with the dispensed precious stone to be debited from an account.
2. The device of claim 1, wherein the device is further configured to:
 prior to dispensing the precious stone, receive acknowledgment from the financial institution that the account includes available funds of at least the value associated with the precious stone; and
 display an acknowledgement of a debit to the account;

wherein the debit is based on the value associated with the precious stone, and wherein the information received from the user by the user interface indicates the account.

3. The device of claim 1, wherein the dispenser mechanism is further configured to:
dispense a precious metal;
send, to the financial institution via the network interface, information that indicates a value associated with the dispensed precious metal to be debited from the account.

4. The device of claim 3, wherein the precious metal is platinum or palladium.

5. The device of claim 3, wherein the precious metal is a coin.

6. The device of claim 3, wherein the device is further configured to:
assay the precious metal; and
determine the value associated with precious metal based on the assaying.

7. The device of claim 1, wherein the device is further configured to:
identify the precious stone; and
determine the value associated with the precious stone based on the identifying.

8. The device of claim 7, wherein the identifying the precious stone includes imaging at least a portion of the precious stone.

9. The device of claim 6, wherein the precious stone is diamond, emerald, topaz, tanzanite, sapphire, or ruby.

10. The device of claim 1, further comprising an acceptor mechanism configured to receive a second precious stone.

11. The device of claim 10, wherein the device is further configured to:
identify the received second precious stone at least in part by imaging at least a portion of the received second precious stone;
determine a value associated with the received second precious stone based on the identifying; and
send, to the financial institution via the network interface, information that indicates the value associated with the received second precious stone.

12. The device of claim 10, wherein the device is further configured to:
receive a second precious metal;
identify the received second precious metal at least in part by assaying the received second precious metal;
determine a value associated with the received second precious metal based on the identifying; and
send, to the financial institution via the network interface, information that indicates the value associated with the received second precious stone.

13. The device of claim 1, wherein the account is a savings account or a credit account of the user.

14. The device of claim 1, wherein the account is an inventory account.

15. A device, comprising:
a user interface configured to receive information from a user;
an acceptor mechanism configured to receive a precious stone; and
a network interface;
wherein the device is configured to:
identify the received precious stone;
determine a value associated with the received precious stone; and
send, to a financial institution via the network interface, information indicating that the value associated with the received precious stone is to be credited to an account that is indicated by the information received from the user by the user interface.

16. The device of claim 15, wherein the device is further configured to:
receive a precious metal; and
identify the received precious metal at least in part by assaying the received precious metal; and
send, to a financial institution via the network interface, information indicating that the value associated with the received precious metal is to be credited to the account.

17. The device of claim 16, wherein the received precious metal is platinum or palladium.

18. The device of claim 16, wherein the received precious metal is a coin.

19. The device of claim 15, wherein device is configured to identify the received precious stone at least in part by imaging at least a portion of the received precious stone.

20. The device of claim 19, wherein the received precious stone is diamond, emerald, topaz, tanzanite, sapphire, or ruby.

21. The device of claim 15, wherein the device is configured to:
receive acknowledgment from the financial institution of the credit to the account; and
display the acknowledgement of the credit to the account.

22. A method comprising:
a device receiving a precious stone;
the device identifying the received precious stone;
the device determining a value associated with the received precious stone; and
the device sending information to a financial institution via the network interface, wherein the sent second information indicates that the value associated with the received precious stone is to be credited to an account.

23. The method of claim 22, wherein the identifying the received precious stone includes imaging at least a portion of the precious stone.

24. The method of claim 22, further comprising:
the device receiving a precious metal;
the device identifying the received metal;
the device determining a value associated with the received precious metal; and
the device sending, to the financial institution via the network interface, indicating that the value associated with the received precious metal is to be credited to the account.

25. A method comprising:
a device dispensing a precious stone;
the device sending information to a financial institution via a network interface, wherein the sent second information indicates a value associated with the dispensed precious stone is to be debited from an account.

* * * * *

UNITED STATES PATENT AND TRADEMARK OFFICE
CERTIFICATE OF CORRECTION

| | |
|---|---|
| PATENT NO. | : 7,844,547 B2 |
| APPLICATION NO. | : 11/466058 |
| DATED | : November 30, 2010 |
| INVENTOR(S) | : Amos |

It is certified that error appears in the above-identified patent and that said Letters Patent is hereby corrected as shown below:

Title page, item (57), under "Abstract", in Column 2, Line 20, after "stones," delete "i.e." and insert -- i.e., --.

Sheet 12 of 22, Figure 11, Line 1 (above Reference Numeral 54), delete "nitiator" and insert -- Initiator --.

Sheet 16 of 22, Figure 15, Lines 3-5 (second box on right side), delete "Uncle DGIM Z2" and insert -- AAIMTM Z2 --.

Sheet 22 of 22, Figure 21, Line 4 (below figure number), insert -- * CoCa Cola® and Pepsi® are registered trademarks --.

Column 1, line 41, delete "Moneygram," and insert -- MoneyGram, --.

Column 2, line 3, delete "manufactures( or" and insert -- manufactures (or --.

Column 3, line 5, delete "BACKGROUND OF THE INVENTION". (Repeated heading)

Column 5, line 34, delete "metals." and insert -- metals --.

Column 7, line 12, delete "see" and insert -- See --.

Column 7, line 24, delete "ok" and insert -- ok. --.

Column 7, line 60, delete "electromechanical" and insert -- electro-mechanical --.

Column 8, line 33, delete "6,377,238" and insert -- 6,377,238, --.

Signed and Sealed this
Nineteenth Day of April, 2011

David J. Kappos
*Director of the United States Patent and Trademark Office*

CERTIFICATE OF CORRECTION (continued)
U.S. Pat. No. 7,844,547 B2

Column 9, line 38, delete "GEM/AAIMTM." and insert -- GEM/AAIMTM --.

Column 10, line 48, delete "24," and insert -- 24 --.

Column 14, line 8, delete "transferred." and insert -- transferred --.

Column 14, line 20, delete "chemical" and insert -- chemical, --.

Column 14, line 20, delete "physical" and insert -- physical, --.

Column 14, line 26, delete "ingress." and insert -- ingress --.

Column 14, line 43, delete "If" and insert -- if --.

Column 15, line 20, delete "on-line." and insert -- on-line --.

Column 17, line 9, delete "nonindependent" and insert -- non-independent --.

Column 17, lines 34-35, delete "dispensers(multiple" and insert -- dispensers (multiple --.

Column 17, line 35, before "good" delete "be a". (Second Occurrence)

Column 17, line 38, delete "themselve." and insert -- themselves. --.

Column 17, line 50, delete "mutitiered." and insert -- multitiered. --.

Column 18, line 50, delete "Tomagraphy." and insert -- Tomography. --.

Column 19, line 19, delete "systems." and insert -- systems --.

Column 19, line 26, delete "wide" and insert -- wide, --.

Column 20, line 29, delete "[8]." and insert -- [8] --.

Column 20, line 47, delete "MIMTM" and insert -- AAIMTM --.

Column 21, line 12, delete "etc.," and insert -- etc. --.

Column 21, line 45, delete "drive" and insert -- drive [34], --.

Column 21, line 52, delete "GEM/Aunty IM [20]" and insert -- GEM/Aunty IM [30] --.

Column 22, line 4, delete "[43]." and insert -- [43] --.

CERTIFICATE OF CORRECTION (continued)
U.S. Pat. No. 7,844,547 B2

Column 22, line 4, delete "[100]." and insert -- [100] --.

Column 22, line 12, delete "[101] ,[100]" and insert -- [101], [100] --.

Column 22, line 54, delete "screen" and insert -- screen [31] --.

Column 22, line 58, delete "optonal" and insert -- optional --.

Column 22, line 67, delete "Russell" and insert -- Russell, --.

Column 23, line 1, delete "Qracle" and insert -- Oracle --.

Column 23, line 23, delete "[20]." and insert -- [20] --.

Column 23, line 62, delete "crytographic" and insert -- cryptographic --.

Column 24, line 12, delete "MIMTM" and insert -- AAIMTM --.

Column 24, line 31, delete "retroffited" and insert -- retrofitted --.

Column 26, line 12, in Claim 16, after "metal;" delete "and".